(12) United States Patent
Shidochi et al.

(10) Patent No.: US 11,336,839 B2
(45) Date of Patent: May 17, 2022

(54) IMAGE DISPLAY APPARATUS

(71) Applicant: TOYOTA JIDOSHA KABUSHIKI KAISHA, Toyota (JP)

(72) Inventors: Yuka Shidochi, Toyota (JP); Goro Asai, Toyota (JP); Kunihiro Sugihara, Nagakute (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 16/194,984

(22) Filed: Nov. 19, 2018

(65) Prior Publication Data

US 2019/0199940 A1 Jun. 27, 2019

(30) Foreign Application Priority Data

Dec. 27, 2017 (JP) .............................. JP2017-250901

(51) Int. Cl.
| | |
|---|---|
| *H04N 5/262* | (2006.01) |
| *B60R 1/00* | (2022.01) |
| *H04N 7/18* | (2006.01) |
| *B60R 1/04* | (2006.01) |
| *G08G 1/16* | (2006.01) |

(52) U.S. Cl.
CPC ............. *H04N 5/2628* (2013.01); *B60R 1/00* (2013.01); *H04N 5/2624* (2013.01); *H04N 7/181* (2013.01); *B60R 1/04* (2013.01); *B60R 2300/105* (2013.01); *B60R 2300/30* (2013.01); *B60R 2300/8066* (2013.01); *G08G 1/166* (2013.01)

(58) Field of Classification Search
CPC ...... H04N 5/2628; H04N 5/2624; B60R 1/00; B60R 2300/30; B60R 2300/8066; B60R 2300/105
See application file for complete search history.

(56) References Cited

U.S. PATENT DOCUMENTS

| | | | | |
|---|---|---|---|---|
| 5,670,935 | A | * | 9/1997 | Schofield .............. B60S 1/0844 340/461 |
| 5,956,181 | A | * | 9/1999 | Lin ........................... B60R 1/12 359/630 |
| 6,593,960 | B1 | | 7/2003 | Sugimoto et al. |

(Continued)

FOREIGN PATENT DOCUMENTS

| | | |
|---|---|---|
| EP | 1 077 161 A2 | 2/2001 |
| EP | 3 157 782 B1 | 4/2019 |

(Continued)

*Primary Examiner* — Shawn S An
(74) *Attorney, Agent, or Firm* — Sughrue Mion, PLLC

(57) ABSTRACT

An image display apparatus has: a synthesizing device (132) for synthesizing a rear image (111B) captured by a rear imaging device (11B) for imaging a rear area of the vehicle (1) and a first rear side image (111BL, 111BR) captured by a first rear side imaging device (11BL, 11BR) for imaging a first rear side area of the vehicle to generate a synthesized image (111C); and a displaying device (14) for displaying the synthesized image. The synthesizing device varies a proportion of an area of each of the rear image and the first rear side image to the synthesized image on the basis of a first information relating to a first turn indicator configured to operate to inform that the vehicle travels rightward or leftward.

9 Claims, 12 Drawing Sheets

(56) References Cited

U.S. PATENT DOCUMENTS

| | | | |
|---|---|---|---|
| 2004/0002794 A1* | 1/2004 | Pillar | G07C 5/08 |
| | | | 701/1 |
| 2007/0165108 A1 | 7/2007 | Yuasa et al. | |
| 2008/0231703 A1 | 9/2008 | Nagata et al. | |
| 2011/0074916 A1* | 3/2011 | Demirdjian | H04N 7/181 |
| | | | 348/36 |
| 2011/0106380 A1 | 5/2011 | Wang et al. | |
| 2014/0114534 A1* | 4/2014 | Zhang | H04N 5/23238 |
| | | | 701/42 |
| 2014/0121899 A1* | 5/2014 | Sung | B60R 1/00 |
| | | | 701/36 |
| 2014/0226008 A1* | 8/2014 | Lang | B60R 1/00 |
| | | | 348/148 |
| 2014/0240551 A1* | 8/2014 | Kim | H04N 5/272 |
| | | | 348/239 |
| 2016/0280136 A1* | 9/2016 | Besson | B60R 1/00 |
| 2018/0309962 A1* | 10/2018 | Shimizu | B60R 1/00 |
| 2019/0144001 A1* | 5/2019 | Choi | B60W 50/14 |
| | | | 701/117 |
| 2019/0191081 A1* | 6/2019 | Shidochi | G06K 9/00805 |

FOREIGN PATENT DOCUMENTS

| | | |
|---|---|---|
| JP | 6-227318 A | 8/1994 |
| JP | 10-257482 A | 9/1998 |
| JP | 2001-55100 A | 2/2001 |
| JP | 2002-36954 A | 2/2002 |
| JP | 2003-81014 A | 3/2003 |
| JP | 2006-338566 A | 12/2006 |
| JP | 2007-158427 A | 6/2007 |
| JP | 2008-230558 A | 10/2008 |
| JP | 2011-93495 A | 5/2011 |
| JP | 2017-521322 A | 8/2017 |
| WO | 2009/132617 A1 | 11/2009 |
| WO | 2017/122294 A1 | 7/2017 |

\* cited by examiner

IMAGE DISPLAY APPARATUS

TECHNICAL FIELD

The present invention relates to a technical field of an image display apparatus that is configured to synthesize images that are captured by a plurality of imaging devices placed at a vehicle and to display the synthesized image, for example.

BACKGROUND ART

Each of a Patent Literature 1 and a Patent Literature 2 discloses one example of an image display apparatus. Specifically, the Patent Literature 1 discloses an image display apparatus that is configured to generate a synthesized image by synthesizing a rear side image (a rear and lateral image) that is captured by a camera configured to image a rear side area (a rear and lateral area) of a target vehicle and a rear image that is captured by a camera configured to image a rear area of the target vehicle seamlessly at the rear of the target vehicle so that the synthesized image is an image obtained by taking a view of the rear surroundings of the target vehicle from a virtual viewpoint and to display the generated synthesized image on a display apparatus of a vehicle interior mirror. The Patent Literature 2 discloses an image display apparatus that is configured to trim (crop) a rear right image that is captured by a camera configured to image a rear right area of a target vehicle and a rear left image that is captured by a camera configured to image a rear left area of the target vehicle on the basis of a distance between the target vehicle and a rear vehicle that travels at the rear of the target vehicle, to generate a synthesized image by synthesizing the trimmed rear left image and the trimmed rear right image and to display the generated synthesized image.

CITATION LIST

Patent Literature

[Patent Literature 1] Japanese Unexamined Patent Application Publication No. 2008-230558
[Patent Literature 2] Japanese Unexamined Patent Application Publication No. 2006-338566

SUMMARY OF INVENTION

Technical Problem

The image display apparatus disclosed in the Patent Literature 1 synthesizes the rear side image and the rear image without considering a traveling direction of the target vehicle. Therefore, the image display apparatus disclosed in the Patent Literature 1 has a technical problem that there is a possibility that the image display apparatus is not capable of generating the synthesized image that allows an occupant of the target vehicle to understand an surrounding circumstance of the target vehicle appropriately when the target vehicle travels rightward or leftward (for example, the target vehicle turns to the right or the left or the target vehicle makes a lane change).

The above described technical problem is one example of the technical problem to be solved by the present invention. It is therefore an object of the present invention to provide, for example, an image display apparatus that is configured to generate a synthesized image by synthesizing a plurality of images that are captured by a plurality of imaging devices placed at a vehicle, respectively, and that is configured to generate the synthesized image that allows an occupant of the vehicle to understand a surrounding circumstance of the vehicle appropriately when the vehicle travels rightward or leftward.

Solution to Problem

A first aspect of an image display apparatus of the present invention is provided with: a synthesizing device that is configured to synthesize a rear image and a first rear side image to generate a synthesized image, wherein the rear image is captured by a rear imaging device that is configured to image a rear area located at the rear of a vehicle and the first rear side image is captured by a first rear side imaging device that is configured to image a first rear side area located at the rear and either one of the right and the left of the vehicle; and a displaying device that is configured to display the synthesized image, the synthesizing device being configured to vary a proportion of each of a rear image area and a first rear side image area to the synthesized image on the basis of a first information when the synthesizing device generates the synthesized image, wherein the rear image area is an area in which the rear image is displayed in the synthesized image, the first rear side image area is an area in which the first rear side image is displayed in the synthesized image and the first information is an information relating to a first turn indicator that is configured to operate to inform that the vehicle travels toward either one of the right and the left.

A second aspect of an image display apparatus of the present invention is provided with: a synthesizing device that is configured to synthesize a rear image and a first rear side image to generate a synthesized image, wherein the rear image is captured by a rear imaging device that is configured to image a rear area located at the rear of a vehicle and the first rear side image is captured by a first rear side imaging device that is configured to image a first rear side area located at the rear and either one of the right and the left of the vehicle; and a displaying device that is configured to display the synthesized image, the synthesizing device being configured to vary an image angle of at least one of a first image part and a second image part on the basis of a first information when the synthesizing device generates the synthesized image, wherein the first image part is an image part that is one portion of the synthesized image and that corresponds to the rear image, the second image part is an image part that is one portion of the synthesized image and that corresponds to the first rear side image, and the first information is an information relating to a first turn indicator that is configured to operate to inform that the vehicle travels toward either one of the right and the left.

BRIEF DESCRIPTION OF DRAWINGS

Each of FIG. 9A

Each of FIG. 12A

DESCRIPTION OF EMBODIMENTS

Hereinafter, with reference to drawings, one embodiment of the image display apparatus of the present invention will be described. In the following description, a vehicle 1 to which one embodiment of the image display apparatus of the present invention is adapted will be described.

(1) Structure of Vehicle 1

Figure 1:
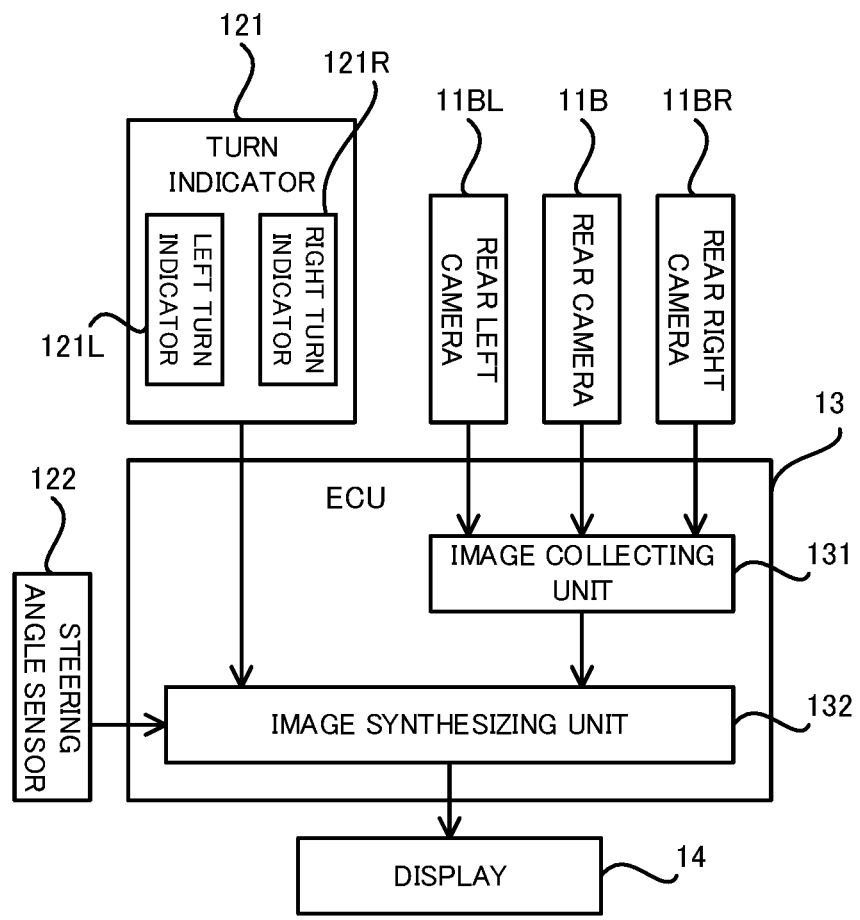
FIG. 1 is a block diagram that illustrates a structure of a vehicle in a present embodiment.
Figure 2A:
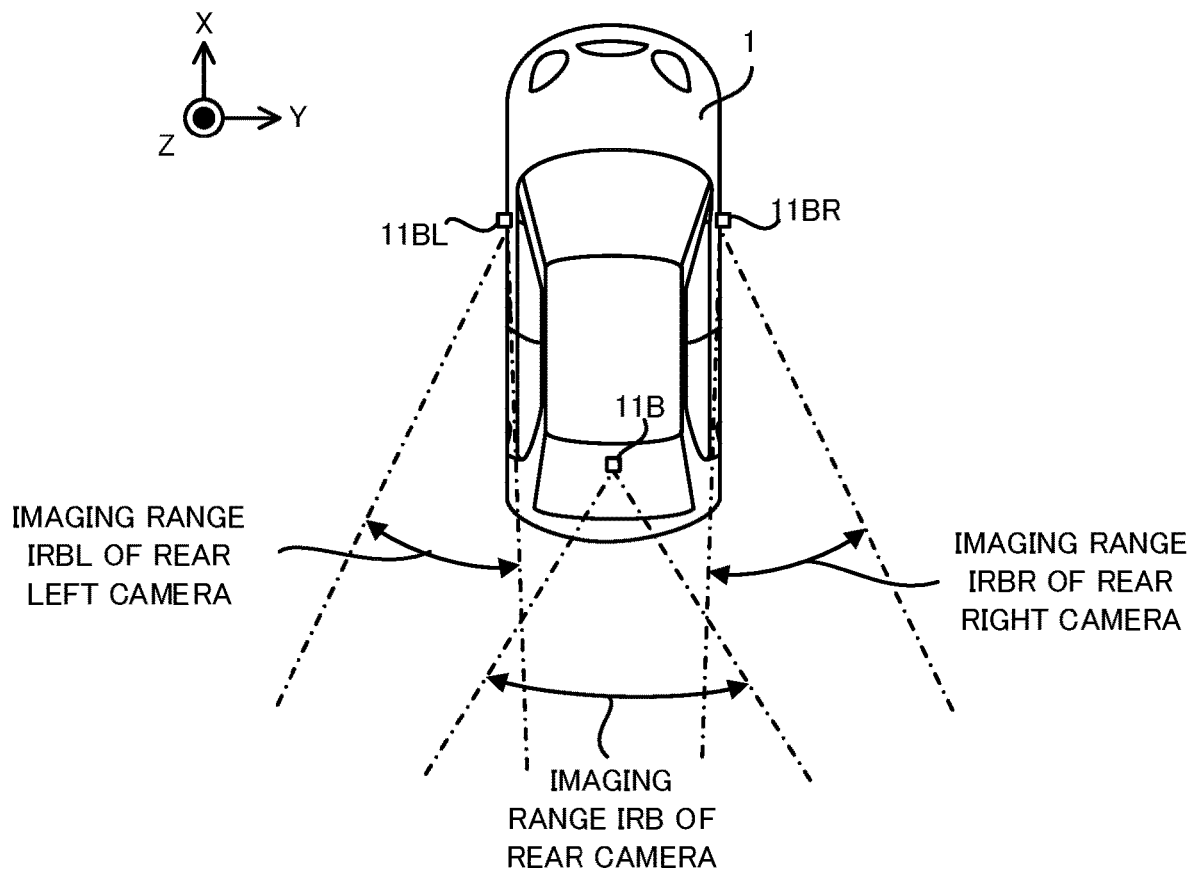
FIG. 2A is a planer view that illustrates positions at which a rear camera, a rear left camera and a rear right camera are placed, respectively, and an imaging range of each of the rear camera, the rear left camera and the rear right camera in the vehicle in the present embodiment.
Figure 2B:
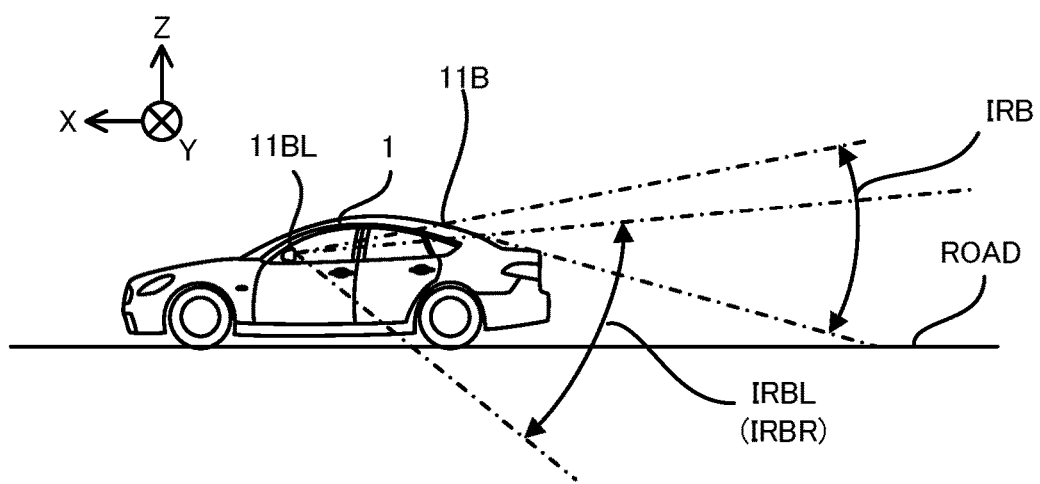
FIG. 2B is a side view that illustrates the positions at which the rear camera, the rear left camera and the rear right camera are placed, respectively, and the imaging range of each of the rear camera, the rear left camera and the rear right camera in the vehicle in the present embodiment.

Firstly, with reference to FIG. 1 and FIG. 2A to FIG. 2B, the structure of the vehicle 1 in the present embodiment will be explained. FIG. 1 is a block diagram that illustrates the structure of the vehicle 1 in a present embodiment. FIG. 2A is a planer view that illustrates positions at which a rear camera 11B, a rear left camera 11BL and a rear right camera 11BR are placed, respectively, and an imaging range of each of the rear camera 11B, the rear left camera 11BL and the rear right camera 11BR in the vehicle 1 in the present embodiment. FIG. 2B is a side view that illustrates the positions at which the rear camera 11B, the rear left camera 11BL and the rear right camera 11BR are placed, respectively, and the imaging range of each of the rear camera 11B, the rear left camera 11BL and the rear right camera 11BR in the vehicle 1 in the present embodiment. Note that the "right", the "left" and the "rear" mean the "right", the "left" and the "rear" based on a traveling direction of the vehicle 1, respectively, in the below described description, if there is no annotation. Moreover, in the below described description, the embodiment will be described by using an XYZ coordinate system in which rightward corresponds to "toward +Y direction", leftward corresponds to "toward −Y direction", backward (rearward) corresponds to "toward −X direction", frontward corresponds to "toward +X direction", upward corresponds to "toward +Z direction", and downward corresponds to "toward −Z direction".

As illustrated in FIG. 1, the vehicle 1 has: the rear camera 11B that is one example of a "rear imaging device" or a "rear imager" in a below described additional statement; the rear left camera 11BL that is one example of either one of a "first rear side imaging device" and a "second rear side imaging device" or either one of a "first rear side imager" and a "second rear side imager" in the below described additional statement; the rear right camera 11BR that is one example of the other one of the "first rear side imaging device" and the "second rear side imaging device" or the other one of the "first rear side imager" and the "second rear side imager" in the below described additional statement; a turn indicator 121; a steering angle sensor 122; an ECU (Electronic Control Unit) 13 that is one example of the "controller" in the below described additional statement; and a display 14 that is one example of a "displaying device" or a "display" in the below described additional statement.

The rear camera 11B is an imaging device that is configured to image (in other words, capture an image of) a rear area located at the rear (especially, just at the rear) of the vehicle 1 (namely, located at a backward position viewed from the vehicle 1), as illustrated in FIG. 2A and FIG. 2B. The rear area corresponds to an area including at least one portion of an area that is reflected in a back mirror, under the assumption that the back mirror is placed in the vehicle interior (in other words, a cabin) of the vehicle 1. Namely, the rear camera 11B is used as a substitute of the back mirror placed at the vehicle interior of the vehicle 1 and constitutes one portion of what we call an electronic mirror, in the present embodiment. An imaging center of the rear camera 11B is just at the rear of the vehicle 1, in order to image the rear area of the vehicle 1. Namely, an optical axis of an optical system such as a lens of the rear camera 11B extends backwardly and straightforwardly from the vehicle 1. As a result, an imaging range (in other words, an angle of an imaging field) IRB that is imaged by the rear camera 11B is set to include the rear area.

The rear left camera 11BL is an imaging device that is configured to image a rear left area located at the rear of the vehicle 1 (especially, at the rear of the vehicle 1 and at the left of the vehicle 1, namely, at a backward and leftward position viewed from the vehicle 1), as illustrated in FIG. 2A and FIG. 2B. The rear left area corresponds to an area including at least one portion of an area that is reflected in a door mirror placed at a left door when the left door is in the closed state (in other words, the left door is closed), under the assumption that the door mirror is placed at the left door of the vehicle 1 that is placed at the left side of the vehicle 1. Namely, the rear left camera 11BL is used as a substitute of the door mirror placed at the left door of the vehicle 1 and constitutes one portion of what we call an electronic mirror, in the present embodiment. An imaging center of the rear left camera 11BL is at the left of vehicle 1 and at the rear of the vehicle 1, in order to image the rear left area of the vehicle 1. In other words, the imaging center of the rear left camera 11BL is at the left of the imaging center of the rear camera 11B. Namely, an optical axis of an optical system such as a lens of the rear left camera 11BL extends backward at the left of the above described optical axis of the optical system of the rear camera 11B. As a result, an imaging range (in other words, angle of imaging field) IRBL that is imaged by the rear left camera 11BL is set to include the rear left area. Note that the imaging range IRBL may overlaps partially with the imaging range IRB.

The rear right camera 11BR is an imaging device that is configured to image a rear right area located at the rear of the vehicle 1 (especially, at the rear of the vehicle 1 and at the right of the vehicle 1, namely, at a backward and rightward position viewed from the vehicle 1), as illustrated in FIG. 2A and FIG. 2B. The rear right area corresponds to an area including at least one portion of an area that is reflected in a door mirror placed at a right door when the right door is in a closed state (in other words, the right door is closed), under the assumption that the door mirror is placed at the right door of the vehicle 1 that is placed at the right side of the vehicle 1. Namely, the rear right camera 11BR is used as a substitute of the door mirror placed at the right door of the vehicle 1 and constitutes one portion of what we call an electronic mirror, in the present embodiment. An imaging center of the rear right camera 11BR is at the right of vehicle 1 and at the rear of the vehicle 1, in order to image the rear right area of the vehicle 1. In other words, the imaging center of the rear right camera 11BR is at the right of the imaging center of the rear camera 11B. Namely, an optical axis of an optical system such as a lens of the rear right camera 11BR extends backward at the right of the above described optical axis of the optical system of the rear camera 11B. As a result, an imaging range (in other words, an angle of an imaging field) IRBR that is imaged by the rear right camera 11BR is set to include the rear right area. Note that the imaging range IRBR may overlaps partially with the imaging range IRB.

The turn indicator 121 is an apparatus that is configured to operate to inform someone around the vehicle 1 of the traveling direction of the vehicle 1 when the vehicle 1 travels rightward or the leftward (for example, the vehicle 1 turns to the right, turns to the left or makes a lane change). The turn indicator 121 includes a left turn indicator 121L that is configured to operate when the vehicle 1 travels leftward (namely, toward the left) and a right turn indicator 121R that is configured to operate when the vehicle 1 travels rightward (namely, toward the right). The present embodiment uses an example in which the left turn indicator 121L is a lamp placed at the relatively left side of the vehicle 1. Moreover, the present embodiment uses an example in which the right turn indicator 121R is a lamp placed at the relatively right side of the vehicle 1. In this case, when the vehicle 1 turns or makes the lane change rightward, the right turn indicator 121R blinks on and off and the left turn indicator 121L is turned off. On the other hand, when the vehicle 1 turns or makes the lane change leftward, the left turn indicator 121L blinks on and off and the right turn indicator 121R is turned off. Note that an information relating to an operating state of the left turn indicator 121L is outputted from the left turn indicator 121L to the ECU 13. Similarly, an information relating to an operating state of the right turn indicator 121R is outputted from the right turn indicator 121R to the ECU 13.

The steering angle sensor 122 is configured to detect a steering angle that is a rotational angle of a steering wheel. An occupant (in other words, a person or a driver) of the vehicle 1 operates the steering wheel in order to control the traveling direction of the vehicle 1. When the occupant operates the steering wheel, a steered wheel of the vehicle 1 is steered in response to the rotation of the steering wheel. Therefore, the steering angle is equivalent to a steered angle of the steered wheel. An information relating to a detection result of the steering angle sensor 122 (namely, an information relating to the steering angle) is outputted from the steering angle sensor 122 to the ECU 13.

The ECU 13 is configured to control entire operation of the vehicle 1. Especially in the present embodiment, the ECU 13 is configured to execute an image display operation for displaying, at the display 14, a rear image 111B, a rear left image 111BL and a rear right image 111BR. The rear image 111B is an image that is captured by the rear camera 11B (namely, an image indicating a circumstance of the rear area). The rear left image 111BL is an image that is captured by the rear left camera 11BL (namely, an image indicating a circumstance of the rear left area). The rear right image 111BR is an image that is captured by the rear right camera 11BR (namely, an image indicating a circumstance of the rear right area). In order to perform the image display operation, the ECU 13 includes, as processing blocks that are logically realized in the ECU 13, an image collecting unit 131 and an image synthesizing unit 132 that is one example of a "synthesizing device" in the below described additional statement.

The image collecting unit 131 is configured to collect the rear image 111B, the rear left image 111BL and the rear right image 111BR from the rear camera 11B, the rear left camera 11BL and the rear right camera 11BR, respectively.

Figure 3:
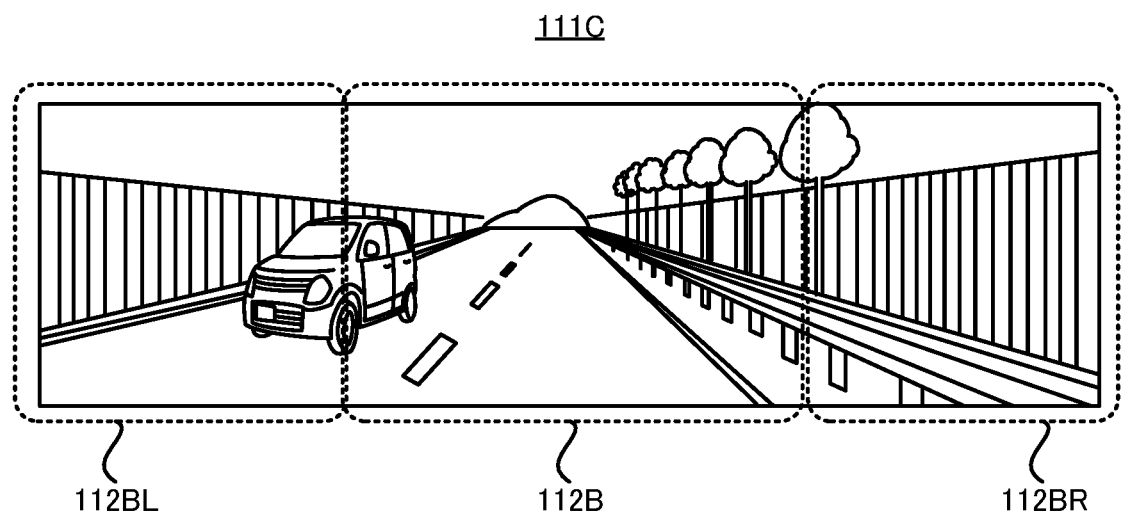
FIG. 3 is a planar view that illustrates a synthesized image generated by an image synthesizing process in the present embodiment.

The image synthesizing unit 132 is configured to generate a synthesized image 111C by executing an image synthesizing process for synthesizing the rear image 111B, the rear left image 111BL and the rear right image 111BR. Specifically, the image synthesizing unit 132 is configured to extract, from the rear image 111B, a rear image 112B corresponding to an image part that is at least one portion of the rear image 111B by trimming (in other words, cropping) the rear image 111B. Moreover, the image synthesizing unit 132 is configured to extract, from the rear left image 111BL, a rear left image 112BL corresponding to an image part that is at least one portion of the rear left image 111BL by trimming the rear left image 111BL. Moreover, the image synthesizing unit 132 is configured to extract, from the rear right image 111BR, a rear right image 112BR corresponding to an image part that is at least one portion of the rear right image 111BR by trimming the rear right image 111BR. Then, the image synthesizing unit 132 is configured to generate the synthesized image 111C in which the rear left area is located on the left of the rear area and the rear right area is located on the right of the rear area. Namely, the image synthesizing unit 132 is configured to generate the synthesized image 111C in which the rear left image 112BL is located on the left of the rear image 112B and the rear right image 112BR is located on the right of the rear image 112B, as illustrated in FIG. 3.

Furthermore, the image synthesizing unit 132 is configured to control the display 14 to display the generated synthesized image 111C. Note that the display 14 is placed in the vehicle interior of the vehicle 1 and is configured to display the synthesized image 111C to the occupant of the vehicle 1 in the vehicle interior.

(2) Flow of Image Display Operation

Figure 4:
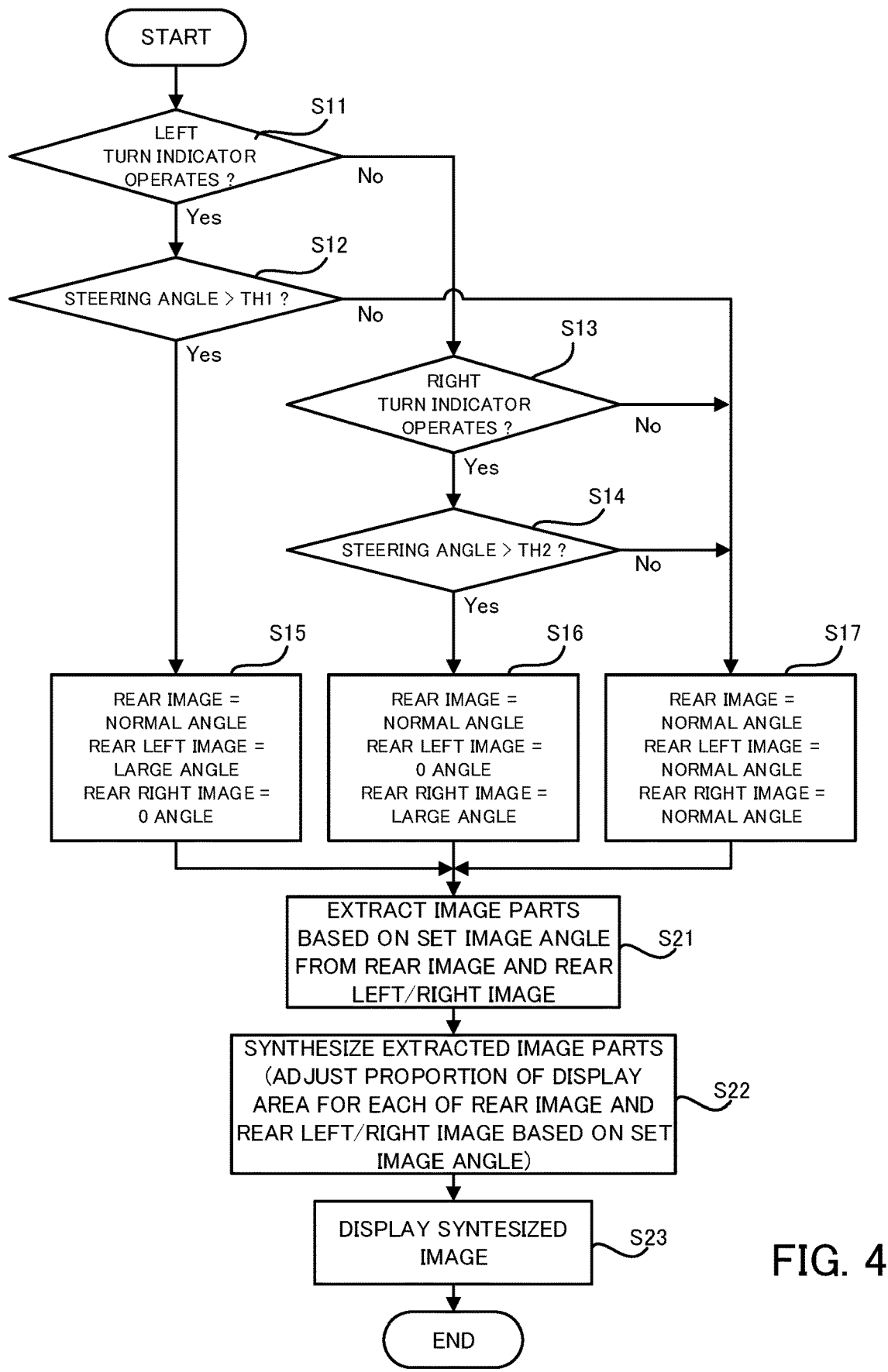
FIG. 4 is a flowchart that illustrates a flow of an image display operation in the present embodiment.

Next, with reference to FIG. 4, a flow of the image display operation in the present embodiment will be described in detail. FIG. 4 is a flowchart that illustrates the flow of the image display operation in the present embodiment.

As illustrated in FIG. 4, the image synthesizing unit 132 determines whether or not the left turn indicator 121L operates (a step S11). Namely, the image synthesizing unit 132 determines whether or not the left turn indicator 121L blinks on and off (the step S11).

As a result of the determination at the step S11, if it is determined that the left turn indicator 121L operates (namely, blinks on and off) (the step S11: Yes), the image synthesizing unit 132 determines whether or not the steering angle is larger than a predetermined threshold value TH1 (a step S12). The steering angle used at the step S12 means a rotational angle of the steering wheel in a counterclockwise direction (namely, in a direction that allows the steered wheel to be steered leftward) from a neutral position of the steering wheel. The threshold value TH1 is set to an appropriate value that allows the image synthesizing unit 132 to distinguish, on the basis of the steering angle, a state where the occupant intends to drive the vehicle 1 so that the vehicle 1 turns to the left from a state where the occupant intends to drive the vehicle 1 so that the vehicle 1 makes the lane change to an adjacent driving lane that is adjacently at the left of a driving lane on which the vehicle 1 currently travels. When the occupant intends to drive the vehicle 1 so that the vehicle 1 turns to the left, there is a higher possibility that the steering angle becomes larger (in other words, wider), compared to the case where the occupant intends to drive the vehicle 1 so that the vehicle 1 makes the lane change. Thus, a state where the steering angle is larger than the threshold value TH1 corresponds to the state where there is a relatively high possibility that the occupant intends to drive the vehicle 1 so that the vehicle 1 turns to the left. On the other hand, a state where the steering angle is smaller than the threshold value TH1 corresponds to the state where there is a relatively high possibility that the occupant intends to drive the vehicle 1 so that the vehicle 1 makes the lane change.

As a result of the determination at the step S12, if it is determined that the steering angle is larger than the threshold value TH1 (the step S12: Yes), it is estimated that the occupant intends to drive the vehicle 1 so that the vehicle 1 turns to the left. In this case, the image synthesizing unit 132 sets a rear image angle θB that is a parameter relating to the rear image 112B to a predetermined normal image angle θB_N (a step S15). Moreover, the image synthesizing unit 132 sets a rear left image angle θBL that is a parameter relating to the rear left image 112BL to a predetermined large image angle (in other words, a wide image angle) θBL_L that is larger (in other words, wider) than a below described predetermined normal image angle θBL_N (the step S15). Moreover, the image synthesizing unit 132 sets a rear right image angle θBR that is a parameter relating to the rear right image 112BR to zero (the step S15).

Figure 5:
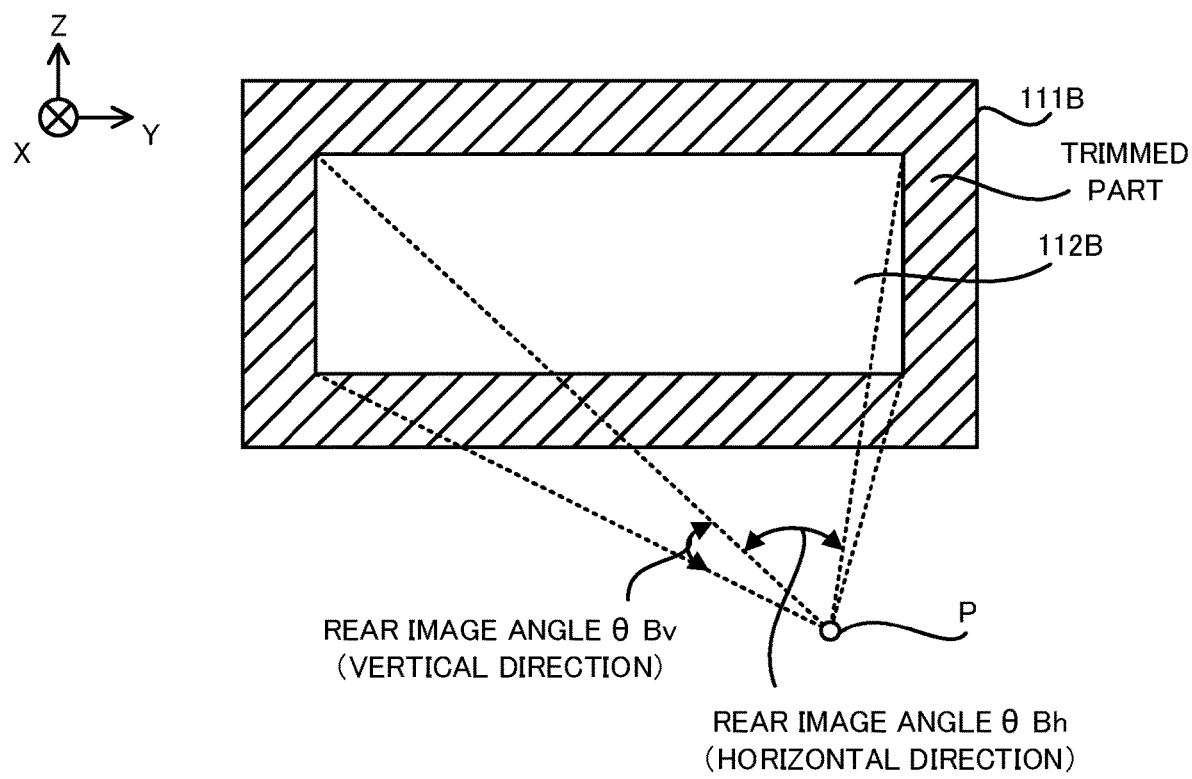
FIG. 5 is a planar view that conceptually illustrates a rear image angle.

The rear image angle θB is a parameter that represents, as an angle from a virtual viewpoint, a range of a scene included in the rear image 112B. Considering that the rear image 112B is at least one portion of the rear image 111B, it can be said that the rear image angle θB is a parameter that represents, as the angle from the virtual viewpoint, an extracted area of the rear image 112B in the rear image 111B (namely, an area in the rear image 111B from which the rear image 112B is extracted), as described later. Specifically, as illustrated in FIG. 5, the rear image 112B corresponds to an image part that is at least one portion of the rear image 111B. Namely, the rear image 112B corresponds to a residual image part after at least one portion of the rear image 111B is trimmed. The extracted area of the rear image 112B (namely, the range of the scene in the rear image 112B) can be expressed by an angle between virtual lines or virtual planes that extend from the virtual viewpoint P to an outer edge of the extracted area. This angle corresponds to the rear image angle θB. As illustrated in FIG. 5, the rear image angle θB typically includes an angle (namely, an angle in the horizontal direction) θBh between virtual lines or virtual planes that extend from the virtual viewpoint P to a pair of vertical outer edges of the extracted area of the rear image 112B and an angle (namely, an angle in the vertical direction) θBv between virtual lines or virtual planes that extend from the virtual viewpoint P to a pair of horizontal outer edges of the extracted area of the rear image 112B. In the present embodiment, the rear image angle θB means the rear image angle θBh that corresponds to the horizontal angle. However, the rear image angle θB may mean the rear image angle θBv that corresponds to the vertical angle, in addition to or instead of the rear image angle θBh. When the rear image angle θB means both of the rear image angle θBh and the rear image angle θBv, a process of setting the rear image angle θB to the normal image angle θB_N at the step S15 includes a process of setting the rear image angle θBh to the normal image angle θBh_N that corresponds to the horizontal angle and a process of setting the rear image angle θBv to the normal image angle θBv_N that corresponds to the vertical angle.

Same applies to the rear left image angle θBL and the rear right image angle θBR, as with the rear image angle θB. Namely, the rear left image angle θBL is a parameter that represents, as an angle (an angle in the horizontal direction in the present embodiment) from the virtual viewpoint, an extracted area of the rear left image 112BL in the rear left image 111BL (in other words, a range of a scene included in the rear left image 112BL). Similarly, the rear right image angle θBR is a parameter that represents, as an angle (an angle in the horizontal direction in the present embodiment) from the virtual viewpoint, an extracted area of the rear right image 112BR in the rear right image 111BR (in other words, a range of a scene included in the rear right image 112BR).

Again in FIG. 4, on the other hand, as a result of the determination at the step S12, if it is determined that the steering angle is equal to or smaller than the threshold value TH1 (the step S12: No), it is estimated that the occupant intends to drive the vehicle 1 so that the vehicle 1 makes the lane change. Alternatively, it is estimated that the occupant mistakenly operates the left turn indicator 121L in some cases, although the occupant does not intend to drive the vehicle 1 so that the vehicle 1 travels leftward. In this case, the image synthesizing unit 132 sets the rear image angle θB to the normal image angle θB_N (a step S17). Moreover, the image synthesizing unit 132 sets the rear left image angle θBL to the normal image angle θBL_N (the step S17). Moreover, the image synthesizing unit 132 sets the rear right image angle θBR to a predetermined normal image angle θBR_N (the step S17).

On the other hand, as a result of the determination at the step S11, if it is determined that the left turn indicator 121L does not operate (namely, is turned off) (the step S11: No), the image synthesizing unit 132 determines whether or not the right turn indicator 121R operates (a step S13). Namely, the image synthesizing unit 132 determines whether or not the right turn indicator 121R blinks on and off (the step S13).

As a result of the determination at the step S13, if it is determined that the right turn indicator 121R operates (namely, blinks on and off) (the step S13: Yes), the image synthesizing unit 132 determines whether or not the steering angle is larger than a predetermined threshold value TH2 (a step S14). The steering angle used at the step S14 means a rotational angle of the steering wheel in a clockwise direction (namely, in a direction that allows the steered wheel to be steered rightward) from the neutral position of the steering wheel. The threshold value TH2 is set to an appropriate value that allows the image synthesizing unit 132 to distinguish, on the basis of the steering angle, a state where the occupant intends to drive the vehicle 1 so that the vehicle 1 turns to the right from a state where the occupant intends to drive the vehicle 1 so that the vehicle 1 makes the lane change to an adjacent driving lane that is adjacently at the right of the driving lane on which the vehicle 1 currently travels. When the occupant intends to drive the vehicle 1 so that the vehicle 1 turns to the right, there is a higher possibility that the steering angle becomes larger, compared to the case where the occupant intends to drive the vehicle 1 so that the vehicle 1 makes the lane change. Thus, a state where the steering angle is larger than the threshold value TH2 corresponds to the state where there is a relatively high possibility that the occupant intends to drive the vehicle 1 so that the vehicle 1 turns to the right. On the other hand, a state where the steering angle is smaller than the threshold value TH2 corresponds to the state where there is a relatively high possibility that the occupant intends to drive the vehicle 1 so that the vehicle 1 makes the lane change. The threshold value TH2 is usually same as the threshold value TH1. However, a value that is different from the threshold value TH1 may be used as the threshold value TH2.

As a result of the determination at the step S14, if it is determined that the steering angle is larger than the threshold value TH2 (the step S14: Yes), it is estimated that the occupant intends to drive the vehicle 1 so that the vehicle 1 turns to the right. In this case, the image synthesizing unit 132 sets the rear image angle $\theta B$ to the normal image angle $\theta B\_N$ (a step S16). Moreover, the image synthesizing unit 132 sets the rear left image angle $\theta BL$ to zero (the step S16). Moreover, the image synthesizing unit 132 sets the rear right image angle $\theta BR$ to a predetermined large image angle $\theta BR\_L$ that is larger than the normal image angle $\theta BR\_N$ (the step S16).

On the other hand, as a result of the determination at the step S14, if it is determined that the steering angle is equal to or smaller than the threshold value TH2 (the step S14: No), it is estimated that the occupant intends to drive the vehicle 1 so that the vehicle 1 makes the lane change. Alternatively, it is estimated that the occupant mistakenly operates the right turn indicator 121R in some cases, although the occupant does not intend to drive the vehicle 1 so that the vehicle 1 travels rightward. In this case, the image synthesizing unit 132 sets the rear image angle $\theta B$, the rear left image angle $\theta BL$ and the rear right image angle $\theta BR$ to the normal image angle $\theta B\_N$, the normal image angle $\theta BL\_N$ and the normal image angle $\theta BR\_N$, respectively (the step S17).

On the other hand, as a result of the determination at the step S13, if it is determined that the right turn indicator 121R does not operate (namely, is turned off) (the step S13: No), the image synthesizing unit 132 sets the rear image angle $\theta B$, the rear left image angle $\theta BL$ and the rear right image angle $\theta BR$ to the normal image angle $\theta B\_N$, the normal image angle $\theta BL\_N$ and the normal image angle $\theta BR\_N$, respectively (the step S17).

Then, the image synthesizing unit 132 extracts, as the rear image 112B, an image part corresponding to the rear image angle $\theta B$ set at the step S15, S16 or S17 from the rear image 111B (a step S21). Note that the rear image angle $\theta B$ is set to the normal image angle $\theta B\_N$ in an example illustrated in FIG. 4. Thus, the image synthesizing unit 132 extracts, as the rear image 112B, the image part corresponding to the normal image angle $\theta B\_N$ from the rear image 111B.

Figure 6A:
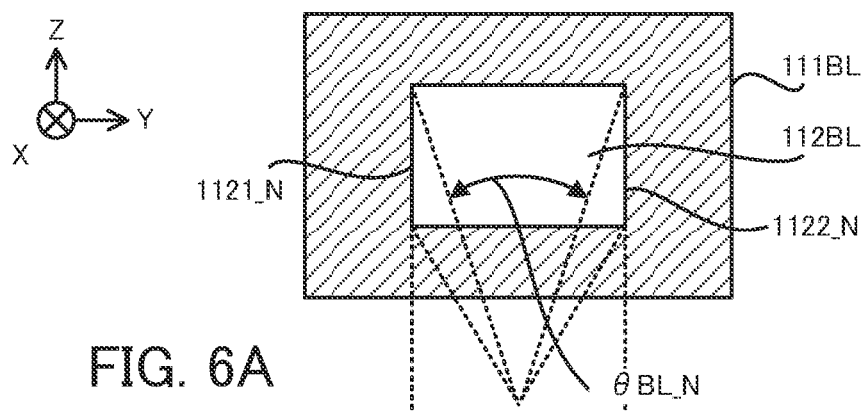
FIG. 6A is a planar view that illustrates a rear left image corresponding to a normal image angle.
Figure 6B:
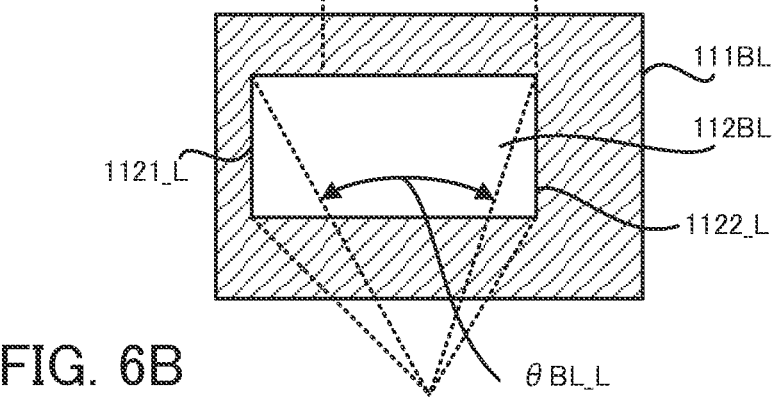
FIG. 6B is a planar view that illustrates the rear left image corresponding to a large image angle.

Moreover, the image synthesizing unit 132 extracts, as the rear left image 112BL, an image part corresponding to the rear left image angle $\theta BL$ set at the step S15, S16 or S17 from the rear left image 111BL (the step S21). For example, when the rear left image angle $\theta BL$ is set to the normal image angle $\theta BL\_N$, the image synthesizing unit 132 extracts, as the rear left image 112BL, a relatively small image part corresponding to the normal image angle $\theta BL\_N$ from the rear left image 111BL, as illustrated in FIG. 6A. For example, when the rear left image angle $\theta BL$ is set to the large image angle $\theta BL\_L$, the image synthesizing unit 132 extracts, as the rear left image 112BL, a relatively large image part corresponding to the large image angle $\theta BL\_L$ from the rear left image 111BL, as illustrated in FIG. 6B. For example, when the rear left image angle $\theta BL$ is set to zero, the image synthesizing unit 132 does not extract the rear left image 112BL from the rear left image 111BL.

It is preferable that the image synthesizing unit 132 extract the rear left image 112BL so that a position of a left side 1121\_L (namely, a side opposite to a right side 1122\_L that forms a boundary with the rear image 112B) of the rear left image 112BL corresponding to the large image angle $\theta BL\_L$ is away leftward from a position of a left side 1121\_N of the rear left image 112BL corresponding to the normal image angle $\theta BL\_N$ in the rear left image 111BL. As a result, the rear left image 112BL corresponding to the large image angle $\theta BL\_L$ includes a scene that is at the left of a scene included in the rear left image 112BL corresponding to the normal image angle $\theta BL\_N$. On the other hand, the image synthesizing unit 132 extracts the rear left image 112BL so that a position of the right side 1122\_L (namely, the side that forms the boundary with the rear image 112B) of the rear left image 112BL corresponding to the large image angle $\theta BL\_L$ is same as or different from a position of a right side 1122\_N of the rear left image 112BL corresponding to the normal image angle $\theta BL\_N$ in the rear left image 111BL.

Figure 7A:
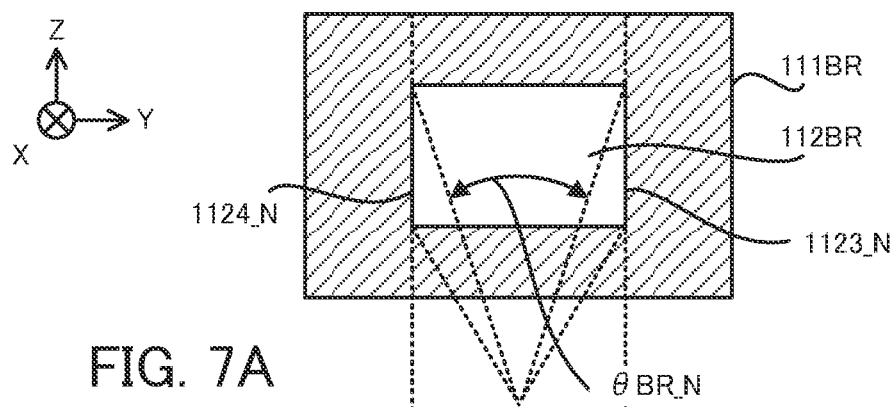
FIG. 7A is a planar view that illustrates a rear right image corresponding to a normal image angle.
Figure 7B:
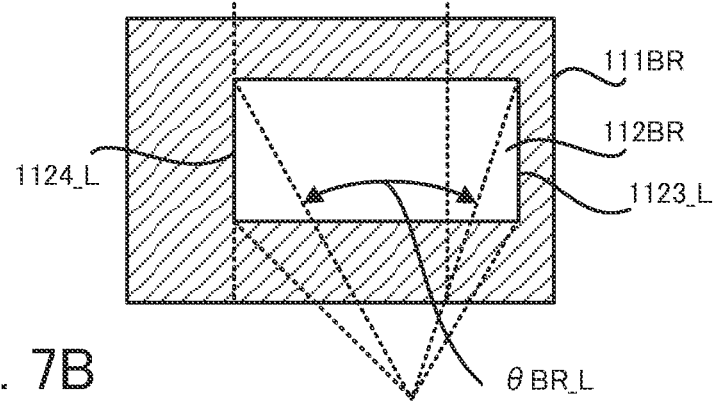
FIG. 7B is a planar view that illustrates the rear right image corresponding to a narrow image angle.

Moreover, the image synthesizing unit 132 extracts, as the rear right image 112BR, an image part corresponding to the rear right image angle $\theta BR$ set at the step S15, S16 or S17 from the rear right image 111BR (the step S21). For example, when the rear right image angle $\theta BR$ is set to the normal image angle $\theta BR\_N$, the image synthesizing unit 132 extracts, as the rear right image 112BR, a relatively small image part corresponding to the normal image angle $\theta BR\_N$ from the rear right image 111BR, as illustrated in FIG. 7A. For example, when the rear right image angle $\theta BR$ is set to the large image angle $\theta BR\_L$, the image synthesizing unit 132 extracts, as the rear right image 112BR, a relatively large image part corresponding to the large image angle $\theta BR\_L$ from the rear right image 111BR, as illustrated in FIG. 7B. For example, when the rear right image angle $\theta BR$ is set to zero, the image synthesizing unit 132 does not extract the rear right image 112BR from the rear right image 111BR.

It is preferable that the image synthesizing unit 132 extract the rear right image 112BR so that a position of a right side 1123\_L (namely, a side opposite to a left side 1124\_L that forms a boundary with the rear image 112B) of the rear right image 112BR corresponding to the large image angle $\theta BR\_L$ is away rightward from a position of a right side 1123\_N of the rear right image 112BR corresponding to the normal image angle $\theta BR\_N$ in the rear right image 111BR. As a result, the rear right image 112BR corresponding to the large image angle θBR_L includes a scene that is at the right of a scene included in the rear right image 112BR corresponding to the normal image angle θBR_N. On the other hand, the image synthesizing unit 132 extracts the rear right image 112BR so that a position of the left side 1124_L (namely, the side that forms the boundary with the rear image 112B) of the rear right image 112BR corresponding to the large image angle θBR_L is same as or different from a position of a left side 1124_N of the rear right image 112BR corresponding to the normal image angle θBR_N in the rear right image 111BR.

Then, the image synthesizing unit 132 generates the synthesized image 111C in which the rear left image 112BL is located on the left of the rear image 112B and the rear right image 112BR is located on the right of the rear image 112B by using the rear image 112B, the rear left image 112BL and the rear right image 112BR extracted at the step S21 (a step S22). However, when the rear left image angle θBL is set to zero, the image synthesizing unit 132 does not extract the rear left image 112BL, as described above. In this case, the image synthesizing unit 132 generates the synthesized image 111C in which the rear right image 112BR is located on the right of the rear image 112B and the rear left image 112BL is not included. Similarly, when the rear right image angle θBR is set to zero, the image synthesizing unit 132 does not extract the rear right image 112BR, as described above. In this case, the image synthesizing unit 132 generates the synthesized image 111C in which the rear left image 112BL is located on the left of the rear image 112B and the rear right image 112BR is not included.

The image synthesizing unit 132 may execute, as one portion of the image synthesizing process, at least one of an observing point converting process, an image rotating process, a scaling process and an image shape forming process so that the rear image 112B, the rear left image 112BL and the rear right image 112BR are seamlessly connected in the synthesizing image 111C when the image synthesizing unit 132 generates the synthesized image 111C. The observing point converting process is a process for converting an observing point (in other words, a viewpoint) of at least one of the rear image 111B, the rear image 112B, the rear left image 111BL, the rear left image 112BL, the rear right image 111BR and the rear right image 112BR. The image rotating process is a process for rotating at least one of the rear image 111B, the rear image 112B, the rear left image 111BL, the rear left image 112BL, the rear right image 111BR and the rear right image 112BR. The scaling process is a process for scaling (in other words, expanding and/or minifying) at least one of the rear image 111B, the rear image 112B, the rear left image 111BL, the rear left image 112BL, the rear right image 111BR and the rear right image 112BR. The image shape forming process is a process for converting (changing) a shape of at least one of the rear image 111B, the rear image 112B, the rear left image 111BL, the rear left image 112BL, the rear right image 111BR and the rear right image 112BR.

Figure 8A:
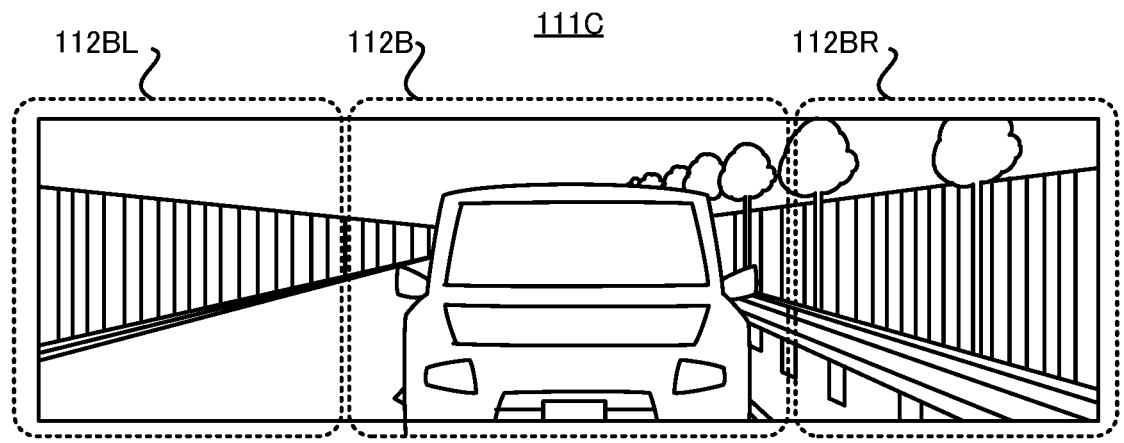
FIG. 8A is a planar view that illustrates one example of a synthesized image generated when a turn indicator does not operate.
Figure 8B:
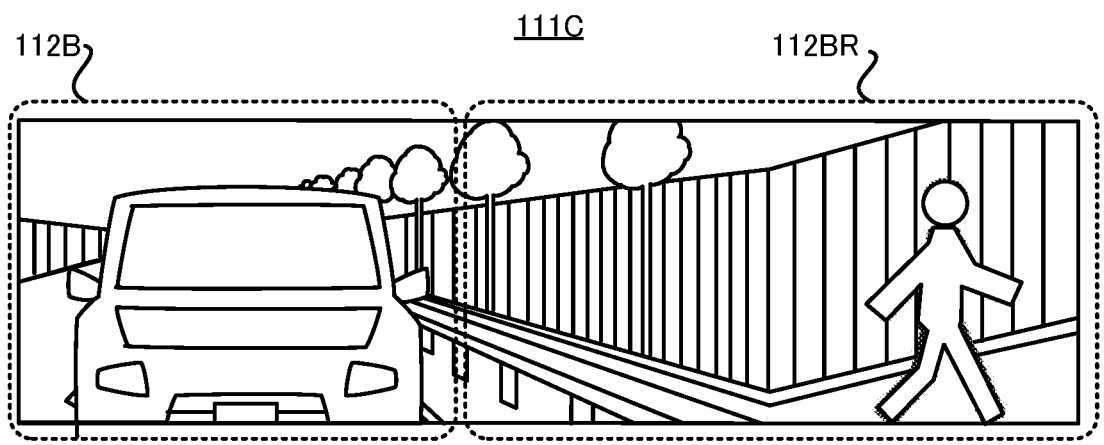
FIG. 8B is a planar view that illustrates one example of the synthesized image generated when a right turn indicator operates.

The rear left image 112BL when the rear left image angle θBL is set to the large image angle θBL_L is larger than the rear left image 112BL when the rear left image angle θBL is set to the normal image angle θBL_N. Thus, the image synthesizing unit 132 generates the synthesized image 111C so that a proportion of an area of the rear left image 112BL to the synthesized image 111C (in other words, a proportion of a rear left image area to the synthesized image 111C, wherein the rear left image area is one portion of the synthesized image 111C and is an area in which the rear left image 112BL is displayed) when the rear left image angle θBL is set to the large image angle θBL_L is larger than the proportion of the area of the rear left image 112BL to the synthesized image 111C when the rear left image angle θBL is set to the normal image angle θBL_N. Namely, the image synthesizing unit 132 generates the synthesized image 111C so that the proportion of the area of the rear left image 112BL to the synthesized image 111C becomes larger as the rear left image angle θBL becomes larger. For the same reason, the image synthesizing unit 132 generates the synthesized image 111C so that a proportion of an area of the rear right image 112BR to the synthesized image 111C becomes larger as the rear right image angle θBR becomes larger. Note that FIG. 8A illustrates one example of the synthesized image 111C generated when the rear image angle θB, the rear left image angle θBL and the rear right image angle θBR are set to the normal image angle θB_N, the normal image angle θBL_N and the normal image angle θBR_N, respectively. On the other hand, FIG. 8B illustrates one example of the synthesized image 111C generated when the rear image angle θB, the rear left image angle θBL and the rear right image angle θBR are set to the normal image angle θB_N, zero and the large image angle θBR_L, respectively (namely, when the vehicle 1 turns to the right).

Then, the display 14 displays the synthesized image 111C generated at the step S22 (a step S23).

In the above described description, if it is determined that the steering angle is same as the threshold value TH1 as a result of the determination at the step S12, the image synthesizing unit 132 executes the process that is executed when it is determined that the steering angle is smaller than the threshold value TH1. However, if it is determined that the steering angle is same as the threshold value TH1, the image synthesizing unit 132 may execute the process that is executed when it is determined that the steering angle is larger than the threshold value TH1. Similarly, in the above described description, if it is determined that the steering angle is same as the threshold value TH2 as a result of the determination at the step S14, the image synthesizing unit 132 executes the process that is executed when it is determined that the steering angle is smaller than the threshold value TH2. However, if it is determined that the steering angle is same as the threshold value TH2, the image synthesizing unit 132 may execute the process that is executed when it is determined that the steering angle is larger than the threshold value TH2.

(3) Technical Effect

As described above, the image display operation in the present embodiment is capable of generating the synthesized image 111C that allows the occupant to understand the surrounding circumstance of the vehicle 1 more appropriately when the vehicle 1 turns to the right or the left, compared to an image display operation in a comparison example in which the rear image angle θB, the rear left image angle θBL and the rear right image angle θBR are fixed and the proportion of the area of each of the rear image 112B, the rear left image 112BL and the rear right image 112BR to the synthesized image 111C is fixed regardless of the operating state of the turn indicator 121.

Specifically, when the vehicle 1 turns to the right (namely, when it is estimated that the occupant intends to drive the vehicle 1 so that the vehicle 1 turns the right, in other words, when the right turn indicator 121R operates and the steering angle is larger than the threshold value TH2), it is preferable that the occupant pay more attention to the circumstance of the rear right area of the vehicle 1. In the present embodiment, the rear right image angle θBR when the vehicle 1 turns to the right is larger than the rear right image angle $\theta BR$ when the vehicle 1 does not turn to the right. When the rear right image angle $\theta BR$ is relatively large, the rear right image 112BR corresponding to the rear right image angle $\theta BR$ includes a scene spreading in the wider or larger field, as illustrated in FIG. 8B. Namely, a blind area that is not included in the rear right image 112BR becomes relatively small. As a result, there is a relatively high possibility that an object (for example, a pedestrian), which might be in the blind area of the rear right image 112BR if the rear right image angle $\theta BR$ does not vary, is included in the rear right image 112BR. Thus, the occupant can understand the circumstance of the rear right area of the vehicle 1 more easily. Namely, the occupant can pay more attention to the circumstance of the rear right area of the vehicle 1. Thus, the image display operation in the present embodiment is capable of generating the synthesized image 111C that allows the occupant to understand the surrounding circumstance of the vehicle 1 (especially, the circumstance of the rear right area of the vehicle 1) appropriately when the vehicle 1 turns to the right.

Moreover, the proportion of the area of the rear right image 112BR to the synthesized image 111C when the vehicle 1 turns to the right is larger than the proportion of the area of the rear right image 112BR to the synthesized image 111C when the vehicle 1 does not turn to the right. Namely, as illustrated in FIG. 8B, the rear right image 112BR is displayed in the synthesized image 111C by using a relatively large displaying area. When the rear right image 112BR is displayed by using the relatively large displaying area, the occupant can pay more attention to the circumstance of the rear right area of the vehicle 1. Thus, the image display operation in the present embodiment is capable of generating the synthesized image 111C that allows the occupant to understand the surrounding circumstance of the vehicle 1 (especially, the circumstance of the rear right area of the vehicle 1) appropriately when the vehicle 1 turns to the right.

Note that the image display operation in the present embodiment is capable of generating the synthesized image 111C that allows the occupant to understand the surrounding circumstance of the vehicle 1 (especially, the circumstance of the rear left area of the vehicle 1) appropriately when the vehicle 1 turns to the left (namely, when it is estimated that the occupant intends to drive the vehicle 1 so that the vehicle 1 turns the left, in other words, when the left turn indicator 121L operates and the steering angle is larger than the threshold value TH1), for the same reason as the case where the vehicle 1 turns to the right.

In addition, the present embodiment is capable of appropriately preventing the occupant from being annoyed by an undesired change of a displayed content of the synthesized image 111C (for example, a change of the displayed content from a displayed content illustrated in FIG. 8A to a displayed content illustrated in FIG. 8B). Specifically, as described above, when the steering angle is equal to or smaller than the threshold value TH1 although the left turn indicator 121L operates, it is estimated that the vehicle 1 makes the lane change or the occupant mistakenly operates the left turn indicator 121L. Namely, it is estimated that the occupant does not intend to drive the vehicle 1 so that the vehicle 1 turns to the left. In this situation, if the image synthesizing unit 132 determines on the basis of only the operating left turn indicator 121L that the occupant intends to drive the vehicle 1 so that the vehicle 1 turns to the left and then varies the rear left image angle $\theta BL$ and the proportion of the area of the rear left image 112BL to the synthesized image 111C, the displayed content of the synthesized image 111C is changed to the displayed content that allows the occupant to appropriately understand the circumstance of the rear left area of the vehicle 1 although the occupant does not intend to drive the vehicle 1 so that the vehicle 1 turns to the left. Thus, there is a possibility that the undesired change of the displayed content of the synthesized image 111C annoys the occupant. On the other hand, in the present embodiment, when it is estimated that the occupant does not intend to drive the vehicle 1 so that the vehicle 1 turns to the left (namely, when the steering angle is equal to or smaller than the threshold value TH1) although the left turn indicator 121L operates, the rear left image angle $\theta BL$ is kept to be the normal image angle $\theta BL\_N$ and the proportion of the area of the rear left image 112L to the synthesized image 111C is kept to be a proportion corresponding to the normal image angle $\theta BL\_N$. Thus, it is possible to prevent the occupant from being annoyed by the undesired change of the displayed content of the synthesized image 111C. Note that same applies to the case where it is estimated that the occupant does not intend to drive the vehicle 1 so that the vehicle 1 turns to the right (namely, when the steering angle is equal to or smaller than the threshold value TH2) although the right turn indicator 121R operates.

In addition, the image display operation in the present embodiment generates the synthesized image 111C that does not include the rear right image 112BR when the vehicle 1 turns to the left. Thus, the image display operation in the present embodiment is capable of generating the synthesized image 111C in which the proportion of the area of the rear left image 112BL to the synthesized image 111C become larger, compared to the case where the synthesized image 111C including the rear right image 112BR is generated. Namely, the image display operation in the present embodiment is capable of displaying the rear left image 112BL by using the larger displaying area. Thus, the image display operation in the present embodiment is capable of generating the synthesized image 111C that allows the occupant to understand the surrounding circumstance of the vehicle 1 (especially, the circumstance of the rear left area of the vehicle 1) more appropriately when the vehicle 1 turns to the left. Note that the image display operation in the present embodiment generates the synthesized image 111C that does not include the rear left image 112BL when the vehicle 1 turns to the right. Thus, the image display operation in the present embodiment is capable of generating the synthesized image 111C that allows the occupant to understand the surrounding circumstance of the vehicle 1 (especially, the circumstance of the rear right area of the vehicle 1) more appropriately when the vehicle 1 turns to the right, for the same reason as the case where the vehicle 1 turns to the left.

(4) Modified Example

Next, modified examples will be described.

(4-1) First Modified Example of Image Display Operation

Figure 9A:
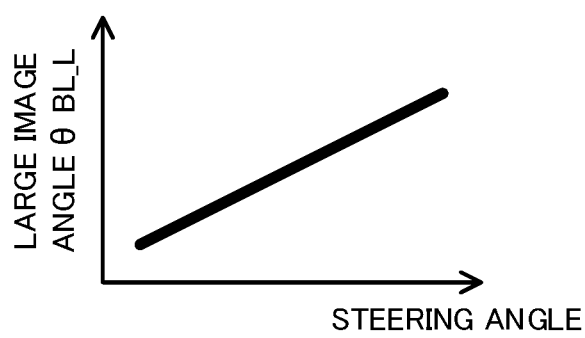
FIG. 9B is a graph that illustrates a relationship between a steering angle and the large image angle.
Figure 9B:
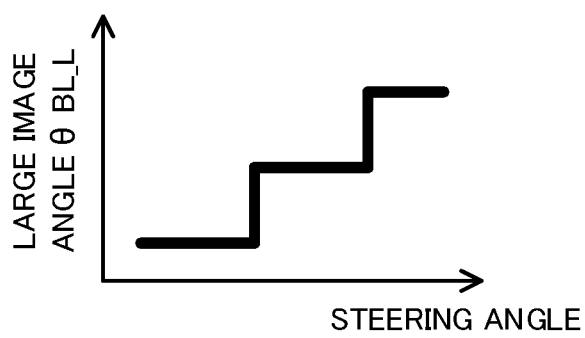

The image synthesizing unit 132 may vary a magnitude of the large image angle $\theta BL\_L$ on the basis of the steering angle (especially, the rotational angle of the steering wheel in the counterclockwise direction from the neutral position of the steering wheel). Specifically, the image synthesizing unit 132 may vary the magnitude of the large image angle $\theta BL\_L$ so that the large image angle $\theta BL\_L$ becomes larger as the steering angle becomes larger, as illustrated in FIG. 9A to FIG. 9B. Note that FIG. 9A illustrates an example in which the large image angle θBL_L becomes larger sequentially and FIG. 9B illustrates an example in which the large image angle θBL_L becomes larger in a stepwise manner. In this case, the large image angle θBL_L becomes larger as occupant rotates the steering wheel in the counterclockwise direction more in order to drive the vehicle 1 so that the vehicle 1 turns to the left. Thus the first modified example of the image display operation is capable of displaying, at the displaying area having an appropriate size, the rear left image 112L including the scene in an appropriate field while considering how an operation by the occupant for turning the vehicle 1 to the left is progressing.

For the same reason, the image synthesizing unit 132 may vary a magnitude of the large image angle θBR_L on the basis of the steering angle (especially, the rotational angle of the steering wheel in the clockwise direction from the neutral position of the steering wheel).

(4-2) Second Modified Example of Image Display Operation

In the above described description, the image synthesizing unit 132 varies the extracted area of the rear left image 112BL in the rear left image 111BL and the extracted area of the rear right image 112BR in the rear right image 111BR, in order to generate the synthesized image 111C corresponding to the rear left image angle θBL and the rear right image angle θBR (namely, the synthesized image 111C including the rear left image 112BL and the rear right image 112BR that correspond to the rear left image angle θBL and the rear right image angle θBR, respectively). Namely, the image synthesizing unit 132 generate the synthesized image 111C corresponding to the rear left image angle θBL and the rear right image angle θBR by executing an image process (an image processing) corresponding to the rear left image angle θBL and the rear right image angle θBR on the rear left image 111BL and the rear right image 111BR. However, the image synthesizing unit 132 may generate the synthesized image 111C corresponding to the rear left image angle θBL and the rear right image angle θBR by using another method. One example of another method of generating the synthesized image corresponding to the rear left image angle θBL and the rear right image angle θBR will be described.

The image synthesizing unit 132 may generate the synthesized image 111C corresponding to the rear left image angle θBL and the rear right image angle θBR by controlling the rear left camera 11BL and the rear right camera 11BR. For example, the image synthesizing unit 132 may generate the synthesized image 111C corresponding to the rear left image angle θBL and the rear right image angle θBR by controlling an optical parameter of each of the rear left camera 11BL and the rear right camera 11BR so that the imaging range IRBL and the imaging range IRBR vary. In this case, varying the optical parameter of the rear left camera 11BL and varying the optical parameter of the rear right camera 11BR are equivalent to varying the rear left image angle θBL and varying the rear right image angle θBR, respectively. A focal length of an optical system (for example, a lens or the like) of each of the rear left camera 11BL and the rear right camera 11BR is one example of the optical parameter. In this case, the image synthesizing unit 132 may control the rear left camera 11BL so that the imaging range IRBL of the rear left camera 11BL is same as a relatively large imaging range IRBL_L corresponding to the large image angle θBL_L, as illustrated in a left-lower part of FIG. 10, when the vehicle 1 turns to the left. On the other hand, the image synthesizing unit 132 may control the rear right camera 11BR so that the imaging range IRBR of the rear right camera 11BR is same as a relatively large imaging range IRBR_L corresponding to the large image angle θBR_L, as illustrated in a right-lower part of FIG. 10, when the vehicle 1 turns to the right. On the other hand, the image synthesizing unit 132 may control the rear left camera 11BL and the rear right camera 11BR so that the imaging range IRBL of the rear left camera 11BL is same as an imaging range IRBL_N corresponding to the normal image angle θBL_N and the imaging range IRBR of the rear right camera 11BR is same as an imaging range IRBR_N corresponding to the normal image angle θBR_N, as illustrated in a upper part of FIG. 10, when the vehicle 1 does not turn to the left and the right. In this case, the rear left image 111BL captured by the rear left camera 11BL is substantially same as the rear left image 112BL. Similarly, the rear right image 111BR captured by the rear right camera 11BR is substantially same as the rear right image 112BR.

Figure 10:
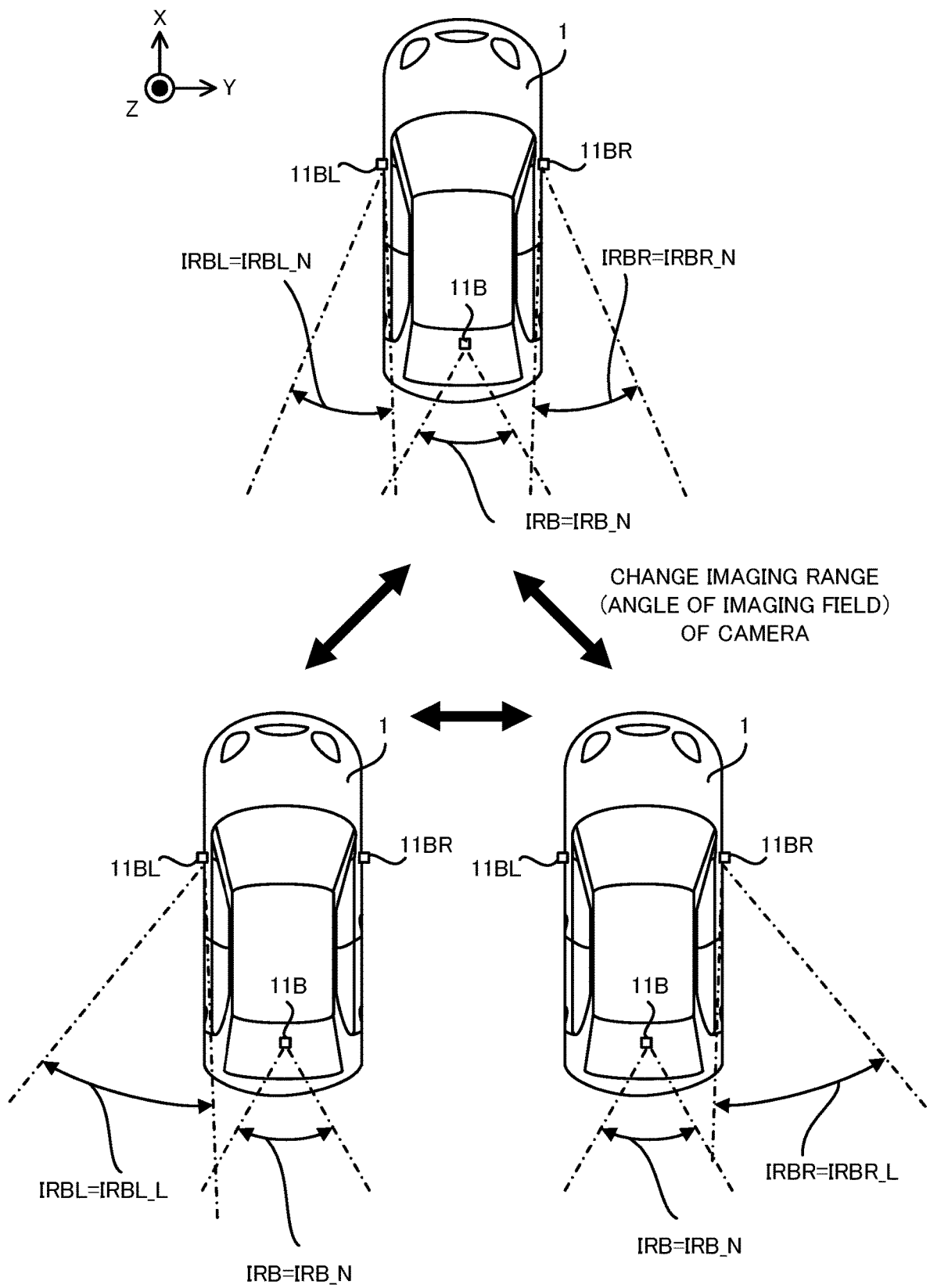
FIG. 10 is a planar view that illustrates the adjusted imaging range of each of the rear camera, the rear left camera and the rear right camera when the vehicle turns to the left, the adjusted imaging range of each of the rear camera, the rear left camera and the rear right camera when the vehicle turns to the right and the adjusted imaging range of each of the rear camera, the rear left camera and the rear right camera when the vehicle does not turn to the left and the right.

Note that FIG. 10 illustrate an example in which the imaging range IRB of the rear camera 11B is always set to an imaging range IRB_N corresponding to the normal image angle θB_N, because the rear image angle θB is always set to the normal image angle θBR_N in the above described description. However, if the rear image angle θB is allowed to be varied as described later, the imaging range IRB of the rear camera 11B may be varied in response to the variation of the rear image angle θB.

Alternatively, when the vehicle 1 is provided with a plurality of rear left cameras 11BL having different imaging ranges IRBL, the imaging synthesizing unit 132 may generate the synthesized image 111C corresponding to the rear left image angle θBL by selecting one rear left camera 11BL that is used to actually capture the rear left image 111BL from the plurality of rear left cameras 11BL on the basis of the operating state of the turn indicator 121 and the steering angle. In this case, changing the used rear left camera 11BL is equivalent to varying the rear left image angle θBL. Specifically, the vehicle 1 may be provided with a rear left camera 11BL_N and a rear left camera 11BL_L. The imaging range IRBL of the rear left camera 11BL_N is the imaging range IRBL_N corresponding to the normal image angle θBL_N. The imaging range IRBL of the rear left camera 11BL_L is the imaging range IRBL_L corresponding to the large image angle θBL_L. In this case, the image synthesizing unit 132 may control the rear left camera 11BL_N and the rear left camera 11BL_L so that the rear left camera 11BL_L captures the rear left image 111BL as illustrated in a left-lower part of FIG. 11 when the vehicle 1 turns to the left and the rear left camera 11BL_N captures the rear left image 111BL as illustrated in an upper part of FIG. 11 when the vehicle 1 does not turns to the left and the right.

Similarly, when the vehicle 1 is provided with a plurality of rear right cameras 11BR having different imaging ranges IRBR, the imaging synthesizing unit 132 may generate the synthesized image 111C corresponding to the rear right image angle θBR by selecting one rear right camera 11BR that is used to actually capture the rear right image 111BR from the plurality of rear right cameras 11BR on the basis of the operating state of the turn indicator 121 and the steering angle. In this case, changing the used rear right camera 11BR is equivalent to varying the rear right image angle θBR. Specifically, the vehicle 1 may be provided with a rear right camera 11BR_N and a rear right camera 11BR_L. The imaging range IRBR of the rear right camera 11BR_N is the imaging range IRBR_N corresponding to the normal image angle θBR_N. The imaging range IRBR of the rear right camera 11BR_L is the imaging range IRBR_L corresponding to the large image angle θBR_L. In this case, the image synthesizing unit 132 may control the rear right camera 11BR_N and the rear right camera 11BR_L so that the rear right camera 11BR_L captures the rear right image 111BR as illustrated in a right-lower part of FIG. 11 when the vehicle 1 turns to the right and the rear right camera 11BL_N captures the rear right image 111BR as illustrated in the upper part of FIG. 11 when the vehicle 1 does not turns to the left and the right. In this case, the rear right image 111BR captured by the rear right camera 11BR is substantially same as the rear right image 112BR.

Figure 11:
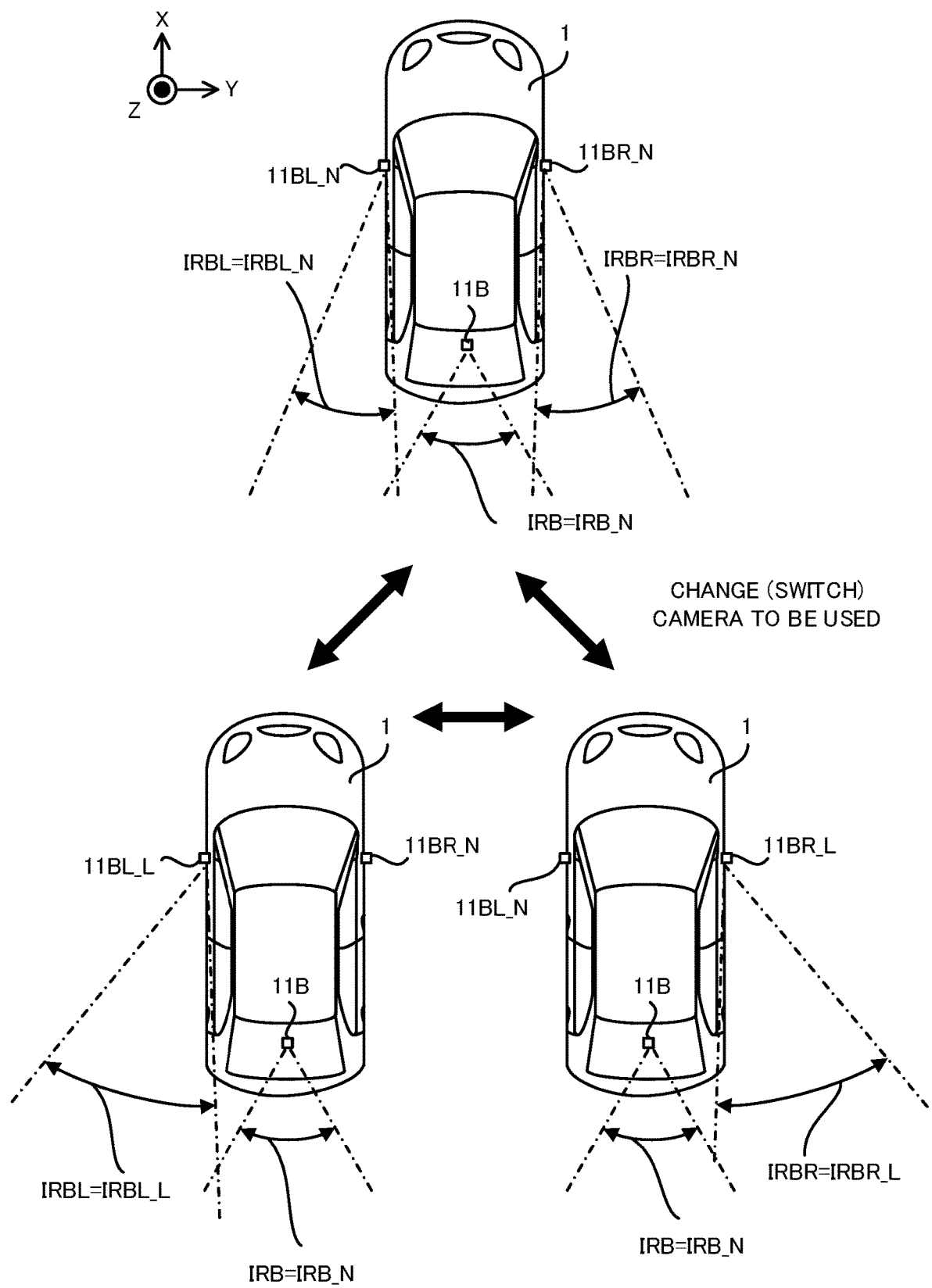
FIG. 11 is a planar view that illustrates the imaging range of each of the rear camera, the rear left camera and the rear right camera selected when the vehicle turns to the left, the imaging range of each of the rear camera, the rear left camera and the rear right camera selected when the vehicle turns to the right and the imaging range of each of the rear camera, the rear left camera and the rear right camera selected when the vehicle does not turn to the left and the right.

Note that the FIG. 11 illustrates an example in which the rear camera 11B having an imaging range IRB_N corresponding to the normal image angle θB_N captures the rear image 111B, because the rear image angle θB is always set to the normal image angle θB_N in the above described description. However, if the rear image angle θB is allowed to be varied as described later, the imaging synthesizing unit 132 may select one rear camera 11B that is used to actually capture the rear image 111B from a plurality of rear cameras 11B of the vehicle 1.

(4-3) Third Modified Example of Image Display Operation

Figure 12A:
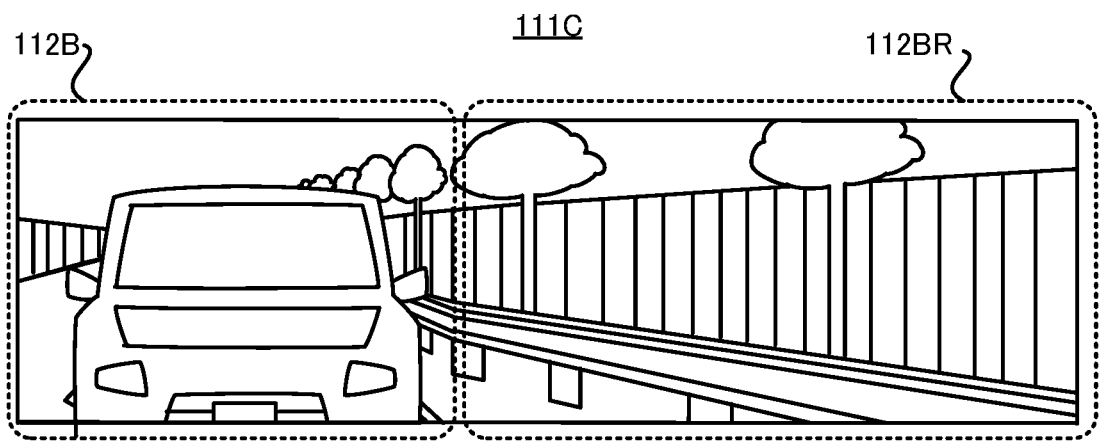
FIG. 12B is a planar view that illustrates one example of the synthesized image.
Figure 12B:
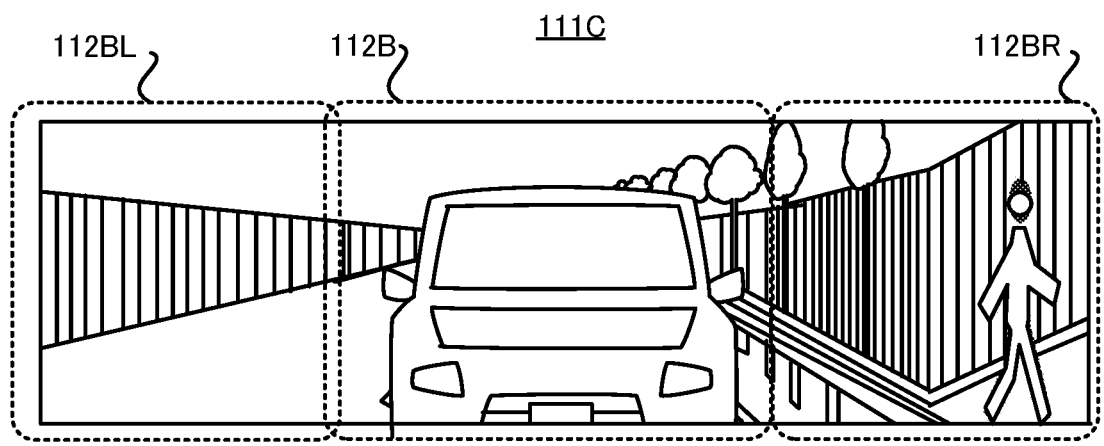

In the above described description, the image synthesizing unit 132 sets the rear right image angle θBR to the large image angle θBR_L and increases the proportion of the area of the rear right image 112BR to the synthesized image 111C, when the vehicle 1 turns to the right. However, the image synthesizing unit 132 increases the proportion of the area of the rear right image 112BR to the synthesized image 111C without varying the rear right image angle θBR (namely, with the rear right image angle θBR being fixed), when the vehicle 1 turns to the right. In this case, as illustrated in FIG. 12A, the image synthesizing unit 132 may expand (in other words, scale up) the rear right image 112BR in the horizontal direction and, and then generate the synthesized image 111C by using the expanded rear right image 112BR. Alternatively, the image synthesizing unit 132 may set the rear right image angle θBR to the large image angle θBR_L without varying the proportion of the area of the rear right image 112BR to the synthesized image 111C, when the vehicle 1 turns to the right. In this case, as illustrated in FIG. 12B, the image synthesizing unit 132 may minify (in other words, scale down) the rear right image 112BR in the horizontal direction, and then generate the synthesized image 111C by using the minified rear right image 112BR. Even in these cases, the variation of the rear right image angle θBR or the variation of the proportion of the area of the rear right image 112BR to the synthesized image 111C allows the display 14 to display the synthesized image 111C that includes the rear right image 112BR in which the scene spreading in the relatively wide field is included or the synthesized image 111C that displays the rear right image 112BR by using the relatively large displaying area. Thus, the fact remains that the occupant can pay more attention to the circumstance of the rear right area of the vehicle 1. Therefore, an effect that is same as the above described effect can be achieved. Same applies to the case where the synthesized image 111C generated when the vehicle 1 turns to the left.

(4-4) Anther Modified Example

In the above described description, the image synthesizing unit 132 sets the rear right image angle θBR to zero, when the vehicle 1 turns to the left. However, the image synthesizing unit 132 may set the rear right image angle θBR to a value that is larger than zero, when the vehicle 1 turns to the left. For example, the image synthesizing unit 132 may set the rear right image angle θBR to a predetermined small image angle (in other words, a narrow image angle) θBR_S that is smaller than the normal image angle θBR_N. Similarly, in the above described description, the image synthesizing unit 132 sets the rear left image angle θBL to zero, when the vehicle 1 turns to the right. However, the image synthesizing unit 132 may set the rear left image angle θBL to a value that is larger than zero, when the vehicle 1 turns to the right. For example, the image synthesizing unit 132 may set the rear left image angle θBL to a predetermined small image angle θBL_S that is smaller than the normal image angle θBL_N.

In the above described description, the image synthesizing unit 132 sets the rear image angle θB to the normal image angle θB, when the vehicle 1 turns to the right or the left. However, the image synthesizing unit 132 may set the rear image angle θB to a predetermined large image angle θB_L that is larger than the normal image angle θB_N or a predetermined small image angle θB_S that is smaller than the normal image angle θB_N, when the vehicle 1 turns to the right or the left. Note that the image synthesizing unit 132 may vary the proportion of the area of the rear image 112B to the synthesized image 111C in response to the variation of the rear image angle θB.

In the above described description, the image synthesizing unit 132 does not set the rear left image angle θBL to the large image angle θBL_L, when the steering angle is equal to or smaller than the threshold value TH1 although the left turn indicator 121L operates. However, the image synthesizing unit 132 may set the rear left image angle θBL to the large image angle θBL_L, when the left turn indicator 121L operates even if the steering angle is equal to or smaller than the threshold value TH1. Similarly, in the above described description, the image synthesizing unit 132 does not set the rear right image angle θBR to the large image angle θBR_L, when the steering angle is equal to or smaller than the threshold value TH2 although the right turn indicator 121R operates. However, the image synthesizing unit 132 may set the rear right image angle θBR to the large image angle θBR_L, when the right turn indicator 121R operates even if the steering angle is equal to or smaller than the threshold value TH2.

In the above described description, the threshold value TH1 that is compared with the steering angle is set to the appropriate value that allows the image synthesizing unit 132 to distinguish the state where the occupant intends to drive the vehicle 1 so that the vehicle 1 turns to the left from the state where the occupant intends to drive the vehicle 1 so that the vehicle 1 makes the lane change to the adjacent driving lane that is adjacently at the left of the driving lane on which the vehicle 1 currently travels. However, the fact remains that it is preferable that the occupant pay attention to the circumstance of the rear left area of the vehicle 1 to some extent when the vehicle 1 makes the lane change to the adjacent driving lane that is adjacently at the left of the driving lane on which the vehicle 1 currently travels. Thus, the threshold value TH1 may be set to an appropriate value that allows the image synthesizing unit 132 to distinguish a state where the occupant intends to drive the vehicle 1 so that the vehicle 1 travels leftward (for example, the vehicle 1 turns to the left or the vehicle 1 makes the lane change to the adjacent driving lane that is adjacently at the left of the driving lane on which the vehicle 1 currently travels) from a state where the occupant does not intend to drive the vehicle 1 so that the vehicle 1 travels leftward (for example, the occupant intends to drive vehicle 1 so that the vehicle 1 travels straightforwardly). As a result, the image display operation is capable of generating the synthesized image 111C that allows the occupant to understand the surrounding circumstance of the vehicle 1 (especially, the circumstance of the rear left area of the vehicle 1) appropriately not only when the vehicle 1 turns to the left but also when the vehicle 1 makes the lane change. For the same reason, the threshold value TH2 that is compared with the steering angle may be set to an appropriate value that allows the image synthesizing unit 132 to distinguish a state where the occupant intends to drive the vehicle 1 so that the vehicle 1 travels rightward (for example, the vehicle 1 turns to the right or the vehicle 1 makes the lane change to the adjacent driving lane that is adjacently at the right of the driving lane on which the vehicle 1 currently travels) from a state where the occupant does not intend to drive the vehicle 1 so that the vehicle 1 travels rightward (for example, the occupant intends to drive vehicle 1 so that the vehicle 1 travels straightforwardly).

(5) Additional Statement

Relating to the above described embodiment, following additional statements will be disclosed.

(5-1) Additional Statement 1

An image display apparatus according to the additional statement 1 is provided with: a synthesizing device that is configured to synthesize a rear image and a first rear side image to generate a synthesized image, wherein the rear image is captured by a rear imaging device that is configured to image a rear area located at the rear of a vehicle and the first rear side image is captured by a first rear side imaging device that is configured to image a first rear side area located at the rear and either one of the right and the left of the vehicle; and a displaying device that is configured to display the synthesized image, the synthesizing device being configured to vary a proportion of each of a rear image area and a first rear side image area to the synthesized image on the basis of a first information when the synthesizing device generates the synthesized image, wherein the rear image area is an area in which the rear image is displayed in the synthesized image, the first rear side image area is an area in which the first rear side image is displayed in the synthesized image and the first information is relating to a first turn indicator that is configured to operate to inform that the vehicle travels toward either one of the right and the left.

Alternatively, an image display apparatus according to the additional statement 1 may be provided with: a controller that is programmed to synthesize a rear image and a first rear side image to generate a synthesized image, wherein the rear image is captured by a rear imager that is configured to image a rear area located at the rear of a vehicle and the first rear side image is captured by a first rear side imager that is configured to image a first rear side area located at the rear and either one of the right and the left of the vehicle; and a display that is configured to display the synthesized image, the controller being programmed to vary a proportion of each of a rear image area and a first rear side image area to the synthesized image on the basis of a first information when the controller generates the synthesized image, wherein the rear image area is an area in which the rear image is displayed in the synthesized image, the first rear side image area is an area in which the first rear side image is displayed in the synthesized image and the first information is an information relating to a first turn indicator that is configured to operate to inform that the vehicle travels toward either one of the right and the left.

The first turn indicator is configured to operate when the vehicle travels toward either one of the right and the left (for example, the vehicle turns to the right, turns to the left or makes a lane change). Thus, the image display apparatus according to the additional statement 1 is capable of generating the synthesized image that allows an occupant of the vehicle to understand a surrounding circumstance of the vehicle more appropriately when the vehicle travels toward either one of the right and the left (namely, rightward or leftward), compared to an image display apparatus in a comparison example that is configured not to vary the proportion of each of the rear image area and the first rear side image area to the synthesized image on the basis of the first information (namely, in which the proportion of each of the rear image area and the first rear side image area to the synthesized image is fixed).

(5-2) Additional Statement 2

An image display apparatus according to the additional statement 2 is the image display apparatus according to the additional statement 1, wherein the synthesizing device is configured to (alternatively, the controller is programmed to) vary the proportion of the first rear side image area to the synthesized image so that the proportion of the first rear side image area to the synthesized image when the first information shows that the first turn indicator operates is larger than the proportion of the first rear side image area to the synthesized image when the first information shows that the first turn indicator does not operate.

When the vehicle travels toward either one of the right and the left, it is preferable that the occupant of the vehicle pay more attention to a circumstance at the rear and either one of the right and the left of the vehicle. In the image display apparatus according to the additional statement 2, the proportion of the first rear side image area to the synthesized image becomes relatively large when the first turn indicator operates. As a result, the occupant of the vehicle can pay more attention to the circumstance at the rear and either one of the right and the left of the vehicle.

(5-3) Additional Statement 3

An image display apparatus according to the additional statement 3 is the image display apparatus according to the additional statement 1 or 2, wherein the synthesizing device is configured to (alternatively, the controller is programmed to) vary the proportion of the first rear side image area to the synthesized image so that the proportion of the first rear side image area to the synthesized image becomes larger as a steered angle of a steered wheel of the vehicle toward either one of the right and the left becomes larger.

The image display apparatus according to the additional statement 3 is allowed to adjust the proportion of the first rear side image to the synthesized image on the basis of a progress of the traveling of the vehicle toward either one of the right and the left. Thus, the image display apparatus according to the additional statement 3 is capable of displaying, in the synthesized image, the first rear side image at a displaying area having an appropriate size based on the progress of the traveling of the vehicle toward either one of the right and the left.

(5-4) Additional Statement 4

An image display apparatus according to the additional statement 4 is the image display apparatus according to any one of the additional statements 1 to 3, wherein the synthesizing device is configured to (alternatively, the controller is programmed to) vary the proportion of each of the rear image area and the first rear side image area to the synthesized image on the basis of the first information when a steered angle of a steered wheel of the vehicle toward either one of the right and the left is larger than a predetermined first threshold value, and the synthesizing device is configured not to (alternatively, the controller is programmed not to) vary the proportion of each of the rear image area and the first rear side image area to the synthesized image when the steered angle is smaller than the first threshold value.

The image display apparatus according to the additional statement 4 is capable of preventing the occupant of the vehicle from being annoyed by an undesired change of a displayed content of the synthesized image.

(5-5) Additional Statement 5

An image display apparatus according to the additional statement 5 is the image display apparatus according to any one of the additional statements 1 to 4, wherein the synthesizing device is configured to (alternatively, the controller is programmed to) synthesize the rear image, the first rear side image and a second rear side image to generate the synthesized image, wherein the second rear side image is captured by a second rear side imaging device (alternatively, a second rear side imager) that is configured to image a second rear side area located at the rear and the other one of the right and the left of the vehicle, the synthesizing device is configured to (alternatively, the controller is programmed to) vary a proportion of each of the rear image area, the first rear side image area and a second rear side image area to the synthesized image on the basis of the first information and a second information when the synthesizing device (alternatively, the controller) generates the synthesized image, wherein the second rear side image area is an area in which the second rear side image is displayed in the synthesized image and the second information is an information relating to a second turn indicator that is configured to operate to inform that the vehicle travels toward the other one of the right and the left, the synthesizing device is configured to (alternatively, the controller is programmed to) vary the proportion of the second rear side image area to the synthesized image so that the proportion of the second rear side image area to the synthesized image becomes zero when the first information shows that the first turn indicator operates and the second information shows that the second turn indicator does not operate.

In the image display apparatus according to the additional statement 5, the synthesized image does not include the second rear side area when the first turn indicator operates and the second turn indicator does not operate. As a result, the proportion of the first rear side image area to the synthesized image is allowed to be larger, compared to the case where the proportion of the second rear side image area to the synthesized image does not become zero (namely, the synthesized image includes the second rear side area).

(5-6) Additional Statement 6

An image display apparatus according to the additional statement 6 is the image display apparatus according to any one of the additional statements 1 to 5, wherein the synthesizing device (alternatively, the controller is programmed to) vary an image angle of at least one of a first image part and a second image part on the basis of the first information when the synthesizing device (alternatively, the controller) generates the synthesized image, wherein the first image part is an image part that is one portion of the synthesized image and that corresponds to the rear image and the second image part is an image part that is one portion of the synthesized image and that corresponds to the first rear side image.

The image display apparatus according to the additional statement 6 is capable of generating the synthesized image that allows the occupant of the vehicle to understand the surrounding circumstance of the vehicle more appropriately when the vehicle travels toward either one of the right and the left, compared to an image display apparatus in a comparison example that is configured not to vary the image angle of each of the first image part and the second image part on the basis of the first information (namely, in which the image angle of each of the first image part and the second image part is fixed). Note that the "image angle of a certain image part" in the additional statement means an index value that represents, as an angle from a virtual viewpoint, a range of a scene included in the certain image part displayed by the displaying device or the display.

(5-7) Additional Statement 7

An image display apparatus according to the additional statement 7 is provided with: a synthesizing device that is configured to synthesize a rear image and a first rear side image to generate a synthesized image, wherein the rear image is captured by a rear imaging device that is configured to image a rear area located at the rear of a vehicle and the first rear side image is captured by a first rear side imaging device that is configured to image a first rear side area located at the rear and either one of the right and the left of the vehicle; and a displaying device that is configured to display the synthesized image, the synthesizing device being configured to vary an image angle of at least one of a first image part and a second image part on the basis of a first information when the synthesizing device generates the synthesized image, wherein the first image part is an image part that is one portion of the synthesized image and that corresponds to the rear image, the second image part is an image part that is one portion of the synthesized image and that corresponds to the first rear side image, and the first information is an information relating to a first turn indicator that is configured to operate to inform that the vehicle travels toward either one of the right and the left.

Alternatively, an image display apparatus according to the additional statement 7 may be provided with: a controller that is programmed to synthesize a rear image and a first rear side image to generate a synthesized image, wherein the rear image is captured by a rear imager that is configured to image a rear area located at the rear of a vehicle and the first rear side image is captured by a first rear side imager that is configured to image a first rear side area located at the rear and either one of the right and the left of the vehicle; and a display that is configured to display the synthesized image, the controller being programmed to vary an image angle of at least one of a first image part and a second image part on the basis of a first information when the controller generates the synthesized image, wherein the first image part is an image part that is one portion of the synthesized image and that corresponds to the rear image, the second image part is an image part that is one portion of the synthesized image and that corresponds to the first rear side image, and the first information is an information relating to a first turn indicator that is configured to operate to inform that the vehicle travels toward either one of the right and the left.

The image display apparatus according to the additional statement 7 is capable of generating the synthesized image that allows the occupant of the vehicle to understand the surrounding circumstance of the vehicle more appropriately when the vehicle travels toward either one of the right and the left, compared to the image display apparatus in the comparison example that is configured not to vary the image angle of each of the first image part and the second image part on the basis of the first information.

(5-8) Additional Statement 8

An image display apparatus according to the additional statement 8 is the image display apparatus according to the additional statement 6 or 7, wherein the synthesizing device is configured to (alternatively, the controller is programmed to) vary the image angle of the second image part so that the image angle of the second image part when the first information shows that the first turn indicator operates is larger than the image angle of the second image part when the first information shows that the first turn indicator does not operate.

In the image display apparatus according to the additional statement 8, the image angle of the second image part becomes relatively large when the first turn indicator operates. If the image angle of the second image part becomes relatively large, the second image part includes the scene spreading in the wider or larger field (namely, a blind area that is not included in the second image part becomes relatively small). As a result, the occupant of the vehicle can pay more attention to the circumstance at the rear and either one of the right and the left of the vehicle. Thus, the image display apparatus is capable of generating the synthesized image that allows the occupant of the vehicle to understand the surrounding circumstance of the vehicle more appropriately when the vehicle travels toward either one of the right and the left.

(5-9) Additional Statement 9

An image display apparatus according to the additional statement 9 is the image display apparatus according to any one of the additional statements 6 to 8, wherein the synthesizing device is configured to (alternatively, the controller is programmed to) vary the image angle of the second image part so that the image angle of the second image part becomes larger as a steered angle of a steered wheel of the vehicle toward either one of the right and the left becomes larger.

The image display apparatus according to the additional statement 9 is allowed to adjust the image angle of the second image part on the basis of the progress of the traveling of the vehicle toward either one of the right and the left. Thus, the image display apparatus according to the additional statement 9 is capable of displaying, in the synthesized image, the second image part having an appropriate image angle based on the progress of the traveling of the vehicle toward either one of the right and the left.

(5-10) Additional Statement 10

An image display apparatus according to the additional statement 10 is the image display apparatus according to any one of the additional statements 6 to 9, wherein the synthesizing device is configured to (alternatively, the controller is programmed to) vary the image angle of at least one of the first image part and the second image part so that the synthesized image generated when the first information shows that the first turn indicator operates includes a second scene that is at either one of the right and the left of a first scene, wherein the first scene is a scene included in the synthesized image generated when the first information shows that the first turn indicator does not operate.

The image display apparatus according to the additional statement 10 is capable of generating the synthesized image including the second image part that shows the circumstance of a wider or larger field at the rear and either one of the right and the left of the vehicle.

(5-11) Additional Statement 11

An image display apparatus according to the additional statement 11 is the image display apparatus according to the additional statement 10, wherein the synthesizing device is configured to (alternatively, the controller is programmed to) vary the image angle of the second image part so that the second scene included in the synthesized image includes a scene that is more distant from the first scene toward either one of the right and the left as a steered angle of a steered wheel of the vehicle toward either one of the right and the left becomes larger.

The image display apparatus according to the additional statement 11 is allowed to adjust a range of the scene included in the second image part on the basis of the progress of the traveling of the vehicle toward either one of the right and the left. Thus, the image display apparatus according to the additional statement 11 is capable of displaying, in the synthesized image, the second image part having an appropriate image angle based on the progress of the traveling of the vehicle toward either one of the right and the left.

(5-12) Additional Statement 12

An image display apparatus according to the additional statement 12 is the image display apparatus according to any one of the additional statements 7 to 11, wherein the synthesizing device is configured to (alternatively, the controller may be programmed to) vary the image angle of at least one of the first image part and the second image part on the basis of the first information when a steered angle of a steered wheel of the vehicle toward either one of the right and the left is larger than a predetermined second threshold value, and the synthesizing device is configured not to (alternatively, the controller may be programmed not to) vary the image angle of each of the first image part and the second image part when the steered angle is smaller than the second threshold value.

The image display apparatus according to the additional statement 12 is capable of preventing the occupant of the vehicle from being annoyed by the undesired change of the displayed content of the synthesized image. Note that the second threshold value may be same as or different from the above described first threshold value.

(5-13) Additional Statement 13

An image display apparatus according to the additional statement 13 is the image display apparatus according to any one of the additional statements 6 to 12, wherein the synthesizing device is configured to (alternatively, the controller is programmed to) synthesize the rear image, the first rear side image and a second rear side image to generate the synthesized image, wherein the second rear side image is captured by a second rear side imaging device (alternatively, a second rear side imager) that is configured to image a second rear side area located at the rear and the other one of the right and the left of the vehicle, the synthesizing device is configured to (alternatively, the controller is programmed to) vary an image angle of at least one of the first image part, the second image part area and a third image part on the basis of the first information and a second information, when the synthesizing device (alternatively, the controller) generates the synthesized image, wherein the third image part is an image part that is one portion of the synthesized image and that corresponds to the second rear side image and the second information is an information relating to a second turn indicator that is configured to operate to inform that the vehicle travels toward the other one of the right and the left, the synthesizing device is configured to (alternatively, the controller is programmed to) vary the image angle of the third image part so that the image angle of the third image part becomes zero when the first information shows that the first turn indicator operates and the second information shows that the second turn indicator does not operate.

As described above, when the first turn indicator operates and the second turn indicator does not operate, it is preferable that the occupant of the vehicle pay more attention to the circumstance at the rear and either one of the right and the left of the vehicle than to the circumstance at the rear and the other one of the right and the left of the vehicle. In the image display apparatus according to the additional statement 13, the image angle of the third image part becomes zero when the first turn indicator operates and the second turn indicator does not operate. Namely, the synthesized image does not include the second rear side image. As a result, the image angle of the second image part is allowed to be larger, compared to the case where the image angle of the third image part does not become zero (namely, the synthesized image includes the second rear side area). Thus, the image display apparatus is capable of generating the synthesized image that allows the occupant of the vehicle to understand the surrounding circumstance of the vehicle more appropriately when the vehicle travels toward either one of the right and the left.

(5-14) Additional Statement 14

An image display apparatus according to the additional statement 14 is the image display apparatus according to any one of the additional statements 7 to 13, the synthesizing device is configured to (alternatively, the controller may be programmed to) vary the image angle of at least one of the first image part and the second image part without varying a proportion of each of a rear image area and a first rear side image area to the synthesized image, wherein the rear image area is an area in which the rear image is displayed in the synthesized image and the first rear side image area is an area in which the first rear side image is displayed in the synthesized image.

(5-15) Additional Statement 15

An image display apparatus according to the additional statement 15 is the image display apparatus according to any one of the additional statements 6 to 14, wherein the synthesizing device is configured to (alternatively, the controller is programmed to) extract the first image part that is at least one portion of the rear image and the second image part that is at least one portion of the first rear side image and to generate the synthesized image by synthesizing the first image part and the second image part, the synthesizing device is configured to (alternatively, the controller is programmed to) vary the image angle of at least one of the first image part and the second image part by varying an area in the rear image from which the first image part is extracted and an area in the first rear side image from which the second image part is extracted on the basis of the first information.

(5-16) Additional Statement 16

An image display apparatus according to the additional statement 16 is the image display apparatus according to any one of the additional statements 6 to 15, wherein the synthesizing device is configured to vary the image angle of at least one of the first image part and the second image part by controlling at least one of the rear imaging device and the first rear side imaging device on the basis of the first information so that an imaging range of at least one of the rear imaging device and the first rear side imaging device varies.

Alternatively, an image display apparatus according to the additional statement 16 may be the image display apparatus according to any one of the additional statements 6 to 15, wherein the controller is programmed to vary the image angle of at least one of the first image part and the second image part by controlling at least one of the rear imager and the first rear side imager on the basis of the first information so that an imaging range of at least one of the rear imager and the first rear side imager varies.

(5-17) Additional Statement 17

An image display apparatus according to the additional statement 17 is the image display apparatus according to any one of the additional statements 6 to 16, wherein the vehicle is provided with a plurality of rear imaging devices having different imaging ranges, respectively, the synthesizing device is configured to vary the image angle of the first image part by selecting, as one rear imaging device that should capture the rear image used for generating the synthesized image, one of the plurality of rear imaging devices on the basis of the first information.

Alternatively, an image display apparatus according to the additional statement 17 may be the image display apparatus according to any one of the additional statements 6 to 16, wherein the vehicle is provided with a plurality of rear imagers having different imaging ranges, respectively, the controller is programmed to vary the image angle of the first image part by selecting, as one rear imager that should capture the rear image used for generating the synthesized image, one of the plurality of rear imagers on the basis of the first information.

(5-18) Additional Statement 18

An image display apparatus according to the additional statement 18 is the image display apparatus according to any one of the additional statements 6 to 17, wherein the vehicle is provided with a plurality of first rear side imaging devices having different imaging ranges, respectively, the synthesizing device is configured to vary the image angle of the second image part by selecting, as one first rear side imaging device that should capture the first rear side image used for generating the synthesized image, one of the plurality of first rear side imaging devices on the basis of the first information.

Alternatively, an image display apparatus according to the additional statement 18 may be the image display apparatus according to any one of the additional statements 6 to 17, wherein the vehicle is provided with a plurality of first rear side imagers having different imaging ranges, respectively, the controller is programmed to vary the image angle of the second image part by selecting, as one first rear side imager that should capture the first rear side image used for generating the synthesized image, one of the plurality of first rear side imagers on the basis of the first information.

At least one portion of the feature in the above described embodiment and the modified example may be eliminated or modified accordingly. At least one feature in the above described embodiment and the modified example may be combined with another one feature in the above described embodiment and the modified example.

This application is based upon and claims the benefit of priority of the prior Japanese Patent Application No. 2017-250901, filed on Dec. 27, 2017, the entire contents of which are incorporated herein by reference. In addition, the entire contents of the above described Patent Literatures 1 to 2 are incorporated herein by reference.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention. An image display apparatus, which involve such changes, are also intended to be within the technical scope of the present invention.

REFERENCE SIGNS LIST 1 vehicle
11B rear camera
11BL, 11BL_N, 11BL_L rear left camera
11BR, 11BR_N, 11BR_L rear right camera
121 turn indicator
121L left turn indicator
121R right turn indicator
122 steering angle sensor
13 ECU
131 image collecting unit
132 image synthesizing unit
14 display
111B, 112B rear image
111BL, 112BL rear left image
111BR, 112BR rear right image
111C synthesized image
IRB, IRB_N, IRBL, IRBL_N, IRBL_L, IRBR, IRBR_N, IRBR_L imaging range
$\theta B$, $\theta Bh$, $\theta Bv$ rear image angle
$\theta BL$ rear left image angle
$\theta BR$ rear right image angle
$\theta B\_N$, $\theta BL\_N$, $\theta BR\_N$ normal image angle
$\theta B\_L$, $\theta BL\_L$, $\theta BR\_L$ large image angle
$\theta B\_S$, $\theta BL\_S$, $\theta BR\_S$ small image angle

The invention claimed is:

1. An image display apparatus comprising:

a controller that is programmed to synthesize a rear image, a left rear side image and a right rear side image to generate a synthesized image, wherein the rear image is captured by a rear imager, that is configured to image a rear area located at the rear of a vehicle, and to capture images viewable by a rear view mirror, wherein the rear image functions as a substitute for the rear view mirror, wherein the left rear side image is captured by a left rear side imager, that is configured to image a left rear side area located at the rear and the left of the vehicle, and to capture images viewable by a left side view mirror, wherein the left rear side image functions as a substitute for the left side view mirror, wherein the right rear side image is captured by a right rear side imager, that is configured to image a right rear side area located at the rear and the right of the vehicle, and to capture images viewable by a right side view mirror, wherein the right rear side image functions as a substitute for the right side view mirror; and a display that forms an electronic mirror in an interior cabin of the vehicle that is configured to display the synthesized image, the controller being programmed to vary a proportion of each of a rear image part, a left image part and a right image part to the synthesized image, and to vary an image angle of at least one of the left rear side image and the right rear side image on the basis of a first information and a second information when the controller generates the synthesized image, wherein the rear image part is an area in which the rear image is displayed in the synthesized image, wherein the left image part is an area in which the left rear side image is displayed in the synthesized image, wherein the right image part is an area in which the right rear side image is displayed, wherein the first information is an information relating to a left turn indicator, that is configured to operate to inform that the vehicle travels toward the left, wherein the second information is an information relating to a right turn indicator, that is configured to operate to inform that the vehicle travels toward the right, the controller is programmed to vary a proportion of the right image part to the synthesized image so that the proportion of the right image part to the synthesized image becomes zero when the first information shows that the left turn indicator operates and the second information shows that the right turn indicator does not operate, the controller is programmed to vary an image angle of the left rear side image so that a first left image angle is larger than a second left image angle, wherein the first left image angle is an image angle of the left rear side image when the first information shows that the left turn indicator operates and the second information shows that the right turn indicator does not operate, wherein the second left image angle is an image angle of the left rear side image when the first information shows that the left turn indicator does not operate and the second information shows that the right turn indicator does not operate, the controller is programmed to vary a proportion of the left image part to the synthesized image so that the proportion of the left image part to the synthesized image becomes zero when the first information shows that the left turn indicator does not operate and the second information shows that the right turn indicator operates, the controller is programmed to vary an image angle of the right rear side image so that a first right image angle is larger than a second right image angle, wherein the first right image angle is an image angle of the right rear side image when the first information shows that the left turn indicator does not operate and the second information shows that the right turn indicator operates, wherein the second right image angle is an image angle of the right rear side image when the first information shows that the left turn indicator does not operate and the second information shows that the right turn indicator does not operate.

2. The image display apparatus according to claim 1, wherein the controller programmed to vary the proportion of the left image part to the synthesized image so that the proportion of the left image part to the synthesized image becomes larger as a steered angle of a steered wheel of the vehicle toward the left becomes larger when the first information shows that the left turn indicator operates and the second information shows that the right turn indicator does not operate, the controller programmed to vary the proportion of the right image part to the synthesized image so that the proportion of the right image part to the synthesized image becomes larger as the steered angle of the steered wheel of the vehicle toward the right becomes larger when the first information shows that the left turn indicator does not operate and the second information shows that the right turn indicator operates.

3. The image display apparatus according to claim 1, wherein, when the left turn indicator operates, and before the image angle is varied, the controller is programmed to determine whether a steering angle is larger than a first threshold value, and then upon a determination that the steering angle is larger than the first threshold value, the first left image angle is made larger than the second left image angle, and when the right turn indicator operates, and before the image angle is varied, the controller is programmed to determine whether the steering angle is larger than a second threshold value, and then upon a determination that the steering angle is larger than the second threshold value, the first right image angle is made larger than the second right image angle.

4. An image display apparatus comprising:

a controller that is programmed to synthesize a rear image, a left rear side image and a right rear side image to generate a synthesized image, wherein the rear image is captured by a rear imager, that is configured to image a rear area located at the rear of a vehicle, and to capture images viewable by a rear view mirror, wherein the rear image functions as a substitute for the rear view mirror, wherein the left rear side image is captured by a left rear side imager, that is configured to image a left rear side area located at the rear and the left of the vehicle, and to capture images viewable by a left side view mirror, wherein the left rear side image functions as a substitute for the left side view mirror, wherein the right rear side image is captured by a right rear side imager, that is configured to image a right rear side area located at the rear and the right of the vehicle, and to capture images viewable by a right side view mirror, wherein the right rear side image functions as a substitute for the right side view mirror; and a display that forms an electronic mirror in an interior cabin of the vehicle that is configured to display the synthesized image, the controller being programmed to vary an image angle of at least one of the rear image, the left rear side image and the right rear side image on the basis of a first information and a second information when the controller generates the synthesized image, wherein the first information is an information relating to a left turn indicator, that is configured to operate to inform that the vehicle travels toward the left, wherein the second information is an information relating to a right turn indicator, that is configured to operate to inform that the vehicle travels toward the right, the controller is programmed to vary an image angle of the right rear side image so that the image angle of the right rear side image becomes zero when the first information shows that the left turn indicator operates and the second information shows that the right turn indicator does not operate, the controller is programmed to vary an image angle of the left rear side image so that the image angle of the left rear side image becomes zero when the first information shows that the left turn indicator does not operate and the second information shows that the right turn indicator operates, wherein the controller is programmed to vary the image angle of the left rear side image so that a first left image angle is larger than a second left image angle, wherein the first left image angle is an image angle of the left rear side image when the first information shows that the left turn indicator operates and the second information shows that the right turn indicator does not operate, wherein the second left image angle is an image angle of the left rear side image when the first information shows that the left turn indicator does not operate and the second information shows that the right turn indicator does not operate, the controller is programmed to vary the image angle of the right rear side image so that a first right image angle is larger than a second right image angle, wherein the first right image angle is an image angle of the right rear side image when the first information shows that the left turn indicator does not operate and the second information shows that the right turn indicator operates, wherein the second right image angle is an image angle of the right rear side image when the first information shows that the left turn indicator does not operate and the second information shows that the right turn indicator does not operate.

5. The image display apparatus according to claim 4, wherein the controller is programmed to vary the image angle of the left rear side image so that the image angle of the left rear side image becomes larger as a steered angle of a steered wheel of the vehicle toward the left becomes larger when the first information shows that the left turn indicator operates and the second information shows that the right turn indicator does not operate, the controller is programmed to vary the image angle of the right rear side image so that the image angle of the right rear side image becomes larger as the steered angle of the steered wheel of the vehicle toward the right becomes larger when the first information shows that the left turn indicator does not operate and the second information shows that the right turn indicator operates.

6. The image display apparatus according to claim 4, wherein
the controller is programmed to vary the image angle of at least one of the rear image and the left rear side image so that the synthesized image including a second left scene, that is at the left of a first scene, is generated when the first information shows that the left turn indicator operates and the second information shows that the right turn indicator does not operate, wherein the first scene is a scene included in the generated synthesized image when the first information shows that the left turn indicator does not operate and the second information shows that the right turn indicator does not operate,
the controller is programmed to vary the image angle of at least one of the rear image and the right rear side image so that the synthesized image including a second right scene, that is at the right of the first scene, is generated when the first information shows that the left turn indicator does not operate and the second information shows that the right turn indicator operates.

7. The image display apparatus according to claim 6, wherein
the controller is programmed to vary the image angle of the left rear side image so that the second left scene includes a scene that is more distant from the first scene toward the left as a steered angle of a steered wheel of the vehicle toward the left becomes larger,
the controller is programmed to vary the image angle of the right rear side image so that the second right scene includes a scene that is more distant from the right scene toward the right as the steered angle of the steered wheel of the vehicle toward the right becomes larger.

8. The image display apparatus according to claim 4, wherein
the controller is programmed to vary the image angle of at least one of the rear image and the left rear side image when the first information shows that the left turn indicator operates and the second information shows that the right turn indicator does not operate, and when a steered angle of a steered wheel of the vehicle toward the left is larger than a predetermined left threshold value,
the controller is programmed not to vary the image angle of each of the rear image and the left rear side image when the first information shows that the left turn indicator operates and the second information shows that the right turn indicator does not operate, and when the steered angle of the steered wheel of the vehicle toward the left is smaller than the predetermined Gecond left threshold value,
the controller is programmed to vary the image angle of at least one of the rear image and the right rear image when the first information shows that the left turn indicator does not operate and the second information shows that the right turn indicator operates, and when the steered angle of the steered wheel of the vehicle toward the right is larger than a predetermined right threshold value,
the controller is programmed not to vary the image angle of each of the rear image and the right rear side image when the first information shows that the left turn indicator does not operate and the second information shows that the right turn indicator operates, and when the steered angle of the steered wheel of the vehicle toward the right is smaller than the predetermined right threshold value.

9. The image display apparatus according to claim 4, wherein,
when the left turn indicator operates, and before the image angle is varied, the controller is programmed to determine whether a steering angle is larger than a first threshold value, and then upon a determination that the steering angle is larger than the first threshold value, the image angle of the right rear side image is made zero, and
when the right turn indicator operates, and before the image angle is varied, the controller is programmed to determine whether the steering angle is larger than a second threshold value, and then upon a determination that the steering angle is larger than the second threshold value, the image angle of the left rear side image is made zero.

* * * * *